United States Patent [19]
Fujitomi et al.

[11] Patent Number: 5,815,419
[45] Date of Patent: Sep. 29, 1998

[54] DATA INTERPOLATING CIRCUIT

[75] Inventors: Masako Fujitomi; Hiroyuki Harada, both of Tokyo, Japan

[73] Assignee: Mitsubishi Denki Kabushiki Kaisha, Tokyo, Japan

[21] Appl. No.: 689,831

[22] Filed: Aug. 14, 1996

[30] Foreign Application Priority Data

Mar. 28, 1996 [JP] Japan ................................. 8-073805

[51] Int. Cl.⁶ ..................................................... G06F 7/30
[52] U.S. Cl. ............................................................ 364/723
[58] Field of Search ........................ 318/573; 364/474.31, 364/577, 723, 726.1, 734; 381/94.4; 704/265; 358/525

[56] References Cited

U.S. PATENT DOCUMENTS

| | | | |
|---|---|---|---|
| 3,789,203 | 1/1974 | Catherall et al. | 364/723 |
| 4,660,162 | 4/1987 | Berlinsky | 364/723 |
| 4,951,244 | 8/1990 | Meyer | 364/723 |
| 5,043,932 | 8/1991 | Asghar et al. | 364/723 |
| 5,075,880 | 12/1991 | Moses et al. | 364/724.1 |
| 5,740,089 | 4/1998 | Menkhoff et al. | 364/723 |

*Primary Examiner*—Ayaz R. Sheikh
*Assistant Examiner*—Douglas S. Lee
*Attorney, Agent, or Firm*—Leydig, Voit & Mayer

[57] ABSTRACT

The present invention provides a data interpolating circuit for n-point data interpolating between two digital data signals. This data interpolating circuit comprises a first hold circuit Y0 for holding first data signal, a second hold circuit Yn (n is an interpolating number) for holding second data signal, and a plurality of (Y(n−1)) pairs of a computing circuit and a hold circuit, wherein the computing circuit computes a mid value $y_i$ (i: an integer; 0<i<n) of two input digital data signals, the hold circuit holds the computed mid value $y_i$, and the data interpolating circuit is connected so that the mid value $y_i$ outputted to the i-th hold circuit Yi of these plurality of pairs is calculated as follows.

$y_i = (y_0 + y_{2i})/2$: in case $i \leq n/2$ $y_i = (y(2_{i-n}) + y_n)/2$: in case $i > n/2$ The present sixteen-times data interpolating circuit decreases errors during interpolation and gives accurate analog conversion.

12 Claims, 16 Drawing Sheets

FIG. 7A
CLK0
(4fs)
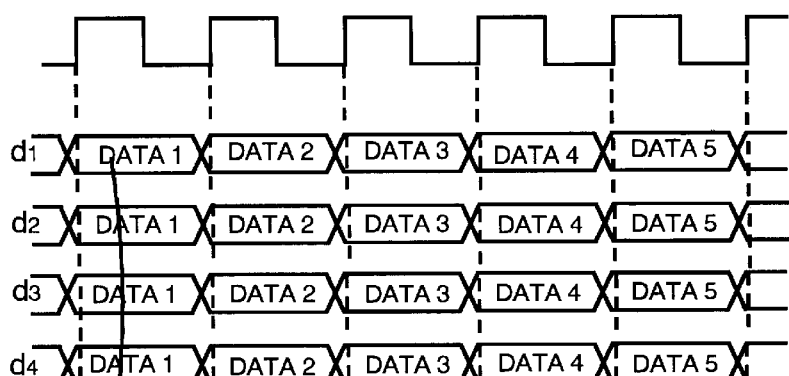
FIG. 7B
OUTPUT OF
FOUR-TIMES
DATA
INTERPOLATING
CIRCUIT
FIG. 7C
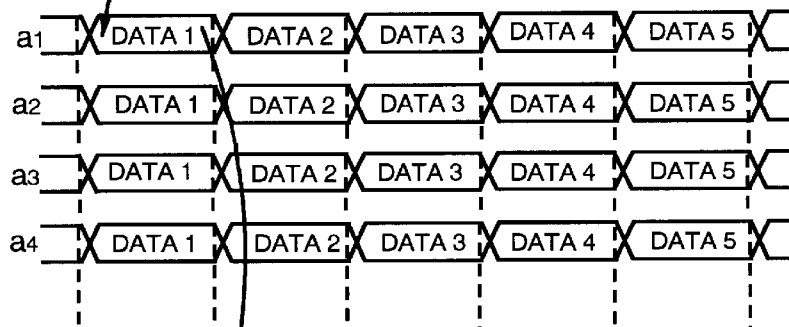
DATA
SIGNAL 1
FIG. 7D
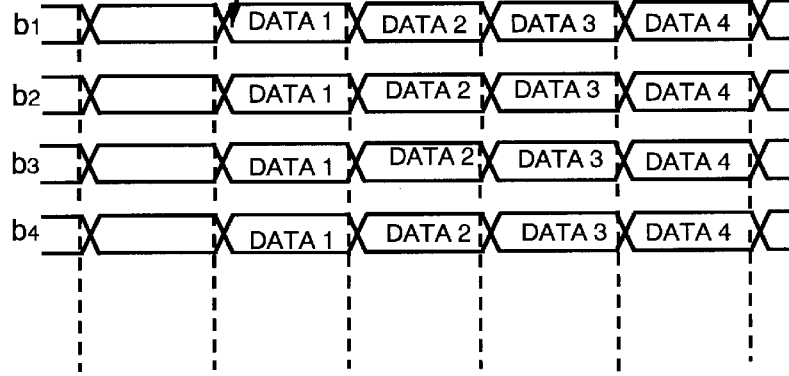
DATA
SIGNAL 2
FIG. 7E
INTERPOLATING
PERIOD OF SIXTEEN-TIMES
DATA INTERPOLATING
CIRCUIT FIG. 9A
CLK00 (2fs)
FIG. 9B
OUTPUT OF
FOUR-TIMES
DATA
INTERPOLATING
CIRCUIT
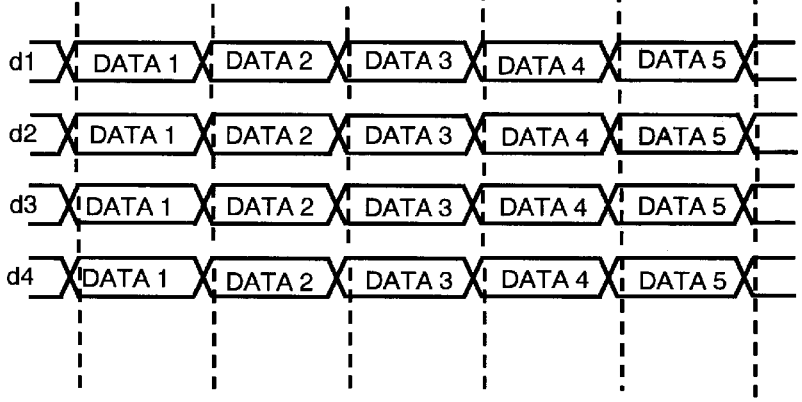
FIG. 9C
DATA SIGNAL 1
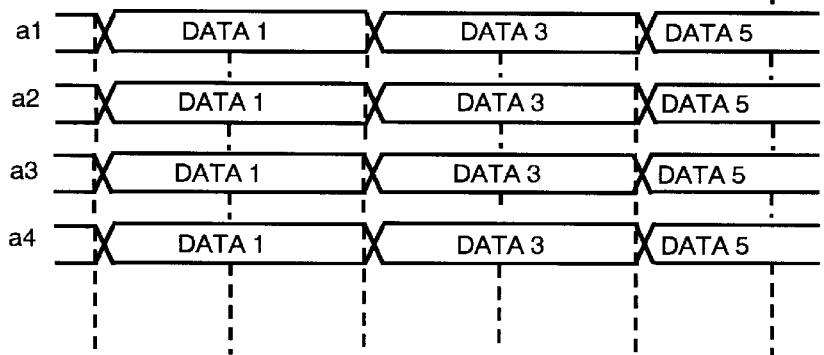
FIG. 9D
DATA SIGNAL 2
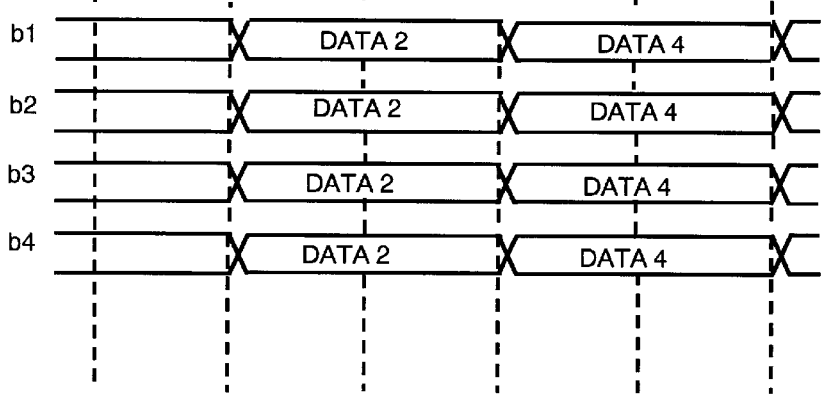
FIG. 9E
INTERPOLATING
PERIOD OF SIXTEEN-TIMES
DATA INTERPOLATING
CIRCUIT
|PERIOD 1|PERIOD 2|PERIOD 3|PERIOD 4|

| Y | Y0 | Y1 | Y2 | Y3 | Y4 | Y5 | Y6 | Y7 |
|---|---|---|---|---|---|---|---|---|
| FORMULA | y0 | $\frac{y0+y2}{2}$ | $\frac{y0+y4}{2}$ | $\frac{y0+y6}{2}$ | $\frac{y0+y8}{2}$ | $\frac{y0+y10}{2}$ | $\frac{y0+y12}{2}$ | $\frac{y0+y14}{2}$ |
| THEORETICAL VALUE | 1 | 1.8125 | 2.625 | 3.4375 | 4.25 | 5.0625 | 5.5875 | 6.6875 |
| OUTPUT RESULT | 1 | 1 | 2 | 3 | 4 | 5 | 5 | 6 |
| MAXIMAL ERROR | 0 | 2 | 3/2 | 2 | 1 | 2 | 3/2 | 2 |

| Y8 | Y9 | Y10 | Y11 | Y12 | Y13 | Y14 | Y15 | Y16 |
|---|---|---|---|---|---|---|---|---|
| $\frac{y0+y16}{2}$ | $\frac{y2+y16}{2}$ | $\frac{y4+y16}{2}$ | $\frac{y6+y16}{2}$ | $\frac{y8+y16}{2}$ | $\frac{y10+y16}{2}$ | $\frac{y12+y16}{2}$ | $\frac{y14+y16}{2}$ | y16 |
| 7.5 | 8.3125 | 9.125 | 9.9375 | 10.75 | 11.5625 | 12.375 | 13.1875 | 14 |
| 7 | 8 | 9 | 9 | 10 | 11 | 12 | 13 | 14 |
| 1/2 | 2 | 3/2 | 2 | 1 | 2 | 3/2 | 2 | — |

FIG. 14

DATA INTERPOLATING CIRCUIT

BACKGROUND OF THE INVENTION

1. Field of the Invention

The invention relates to a data interpolating circuit for interpolating data by approximating separated digital data using a straight line.

2. Description of the prior art

The data interpolating circuit of this type is used for a CD audio signal processing circuit in an audio signal reproducing apparatus for reproducing audio signals recorded on a CD (compact disc) for example. Therefore, an outline of CD (compact disc) audio signal processing is given at first as an application of a digital audio signal processing system. FIG. 16 roughly shows a reproducing apparatus for reproducing audio signals and picture signals recorded on a CD. In FIG. 16, information recorded on a CD 101 is detected by a light pickup 104, amplified by a RF amplifier 105, then inputted into an audio signal processing circuit (reception signal processing apparatus) 110. In the reception signal processing apparatus 110, level of the reception signal is sliced by a PLL slicer 111, and the reception signal is demodulated by an EFM (8–14 modulation) demodulating circuit 113. Error of the signal is corrected by a memory means (SRAM) 119 and an ECC (error code correcting) circuit 120. Signals lost because of data error are interpolated by an interpolating circuit 121. Emphasized signals are de-emphasized by a de-emphasis circuit 122, and inputted into a digital/analog (D/A) converting portion 123. In the D/A converting portion 123, the inputted signals are interpolated by a four-times data interpolating circuit 140 and converted from the digital signal to an analog signal by a digital/analog (D/A) portion 124 to be outputted as audio signals.

It has been very difficult to improve accuracy of the conventional D/A converting portion 123 in this type of CD audio signal processing circuit 110, because the digital data signal from the de-emphasis circuit 122 which is quadrupled by the four-times data interpolating circuit 140, that is, the four-times digital data signal generated based on the input digital data signal is converted to an analog signal by the D/A converting portion 124 and outputted as the audio signal.

To improve this situation, it is possible that the digital data signal is quadrupled by the four-times data interpolating circuit 140 and multiplied by sixteen by a sixteen-times data interpolating circuit, that is, the sixteen-times digital data signal is generated based on the digital data signal from the four-times data interpolating circuit 140, namely, the sixty-four (4×16) times digital data signal generated based on the digital data signal from the de-emphasis circuit 122 is converted from the digital signal to an analog signal by the digital/analog (D/A) portion 124, which increases a sampling frequency of the digital-to-analog conversion to decrease the burden of number of bits or dimension of the D/A portion 124.

However, the sixteen-times data interpolating circuit tends to be complicated in its circuit configuration. Therefore, if the CD audio signal processing circuit 110 is integrated into one chip IC, the one chip IC would be large in size.

The present invention aims to solve the above mentioned problems. The invention provides a data interpolating circuit using a simple circuit configuration for interpolating data by approximating between two successively inputted m-bit digital data with a straight line.

More concretely, the present invention aims to use the sixteen-times data interpolating circuit for interpolating the digital data signal quadrupled by the four-times data interpolating circuit by sixteen times, in order to increase the sampling frequency when converting the digital data signal to analog signal, where the sixteen-times data interpolating circuit has a simple circuit configuration with smaller error of linear approximation during interpolation.

SUMMARY OF THE INVENTION

According to one aspect of the invention, a data interpolating circuit for interpolating (n−1) data between the two digital data signals comprises: a first hold circuit for holding a first data signal and a second hold circuit for holding a second data signal; (n−1) computing means each having a computing circuit for computing a mid value of the two inputted digital signals and a hold circuit for holding the computed mid value; wherein the (n−1) computing means are connected so that a mid value yi held by a hold circuit of an i-th computing means is expressed by following general equations.

$$y_i = (y_0 + y_{2i})/2: \text{ in case } i \leq n/2$$

$$y_i = (y_{(2i-n)} + y_n)/2: \text{ in case } i > n/2;$$

where, an interpolating number n is an integer expressed by second power of 2 (2, 4, 8, 16 . . . ), an integer i is larger than 0 and smaller than n (0<i<n). A 0-th output data signal $y_0$ is the first data signal, an n-th output data signal $y_n$ is the second data signal, an output data signal $y_{2i}$ from a 2i-th computing means is a mid value held by a hold circuit of the 2i-th computing means, an output data signal $y_{(2i-1)}$ from a (2i−n)-th computing means is a mid value held by a hold circuit of the (2i−n)-th computing means.

According to another aspect of the invention, a data interpolating circuit for generating n digital data signals from two digital data signals by interpolating (n−1) data between the two digital data signals comprises: a first hold circuit for holding a first data signal and a second hold circuit for holding a second data signal; (n−1) computing means each having a computing circuit for computing a mid value of the two inputted digital signals and a hold circuit Yi for holding the computed mid value; wherein the (n−1) computing means are connected so that a mid value yi held by a hold circuit of an i-th computing means is expressed by following general equations.

$$y_i = \{y_0 + y_{2i}\}/2 \text{ in case that input terminals is connected to Y0};$$

$$y_i = \{y_{(2i-n)} + y_n\}/2 \text{ in case that the input terminals is connected to Yn};$$

$$y_i = \{y_{(i-j)} + y_{(i+j)}\}/2 : \text{ in case that both input terminals are of connected to Y0 or Yn};$$

where, an interpolating number n is an integer expressed by second power of 2 (2, 4, 8, 16 . . . ), an integer i is larger than 0 and smaller than n (0<i<n), and j is smaller than i and also smaller than n−i. A 0-th inputted data signal y0 is a first data signal, an n-th outputted data signal $y_n$ is a second data signal, an outputted data signal from a 2i-th computing means y2i is a mid value held by a hold circuit of the 2i-th computing means, an outputted data signal $y_{(2i-1)}$ from a (2i−n)-th computing means is a mid value held by a hold circuit of the (2i−n)-th computing means, an outputted data signal $y_{(i-j)}$ from an (i–j)-th computing means is a mid value held by a hold circuit of the (i–j)-th computing means, and an outputted data signal $y_{(i+j)}$ from an (i+j)-th computing means is a mid value held by a hold circuit of the (i+j)-th computing means.

According to further aspect of the invention, a computing circuit of the data interpolating circuit has the same number of full adders as that of the input digital data signals, the full adders obtain a ½ of a sum of the two input digital data signals by adding corresponding bits of the two input digital data signals, outputting a carry signal obtained by the result of addition result to a full adder corresponding to a next higher bit, and obtaining an output digital data signal as an addition result from the output of full adders corresponding to bits except for the least significant bit, wherein a low signal is inputted into a carry input terminal of a full adder corresponding to a least significant bit.

According to further aspect of the invention, a hold circuit of the data interpolating circuit has the same number of flip-flops as the bit number of the input digital data signals, each flip-flop holds. a corresponding bit of the input digital data signals in synchronism with an input clock signal, wherein the held contents are reset in response to an input reset signal.

According to further aspect of the invention, a data interpolating circuit comprises: a first and a second input terminal groups for individually receiving two inputted m-bit digital data signals; $2^k$ (k is an integer) output terminal groups for outputting the m-bit digital data signals respectively; a first hold means for temporarily holding the digital data signal received by the first input terminal group and outputting the digital data signal as a 0-th digital data signal from an output node group connected to the 0-th output terminal group; a second hold means for temporarily holding the digital data signal received by the second input terminal group and outputting the digital data signal as a $2^k$-th digital data signal from an output node group connected to the $2^k$-th output terminal group; and ($2^k$–1) (k is an integer and has the same value as that of mentioned above) computing means provided corresponding to the first ~($2^k$–1) output terminal groups.

Wherein, the respective computing means has an adding means and an hold means, the adding means having a first input node group and a second input node group for receiving digital data signals respectively for adding the two digital data signals inputted into the first input node group and the second input node group and outputting the addition result, and the hold means for temporarily holding an m-bit digital data signal among the addition result received from the adding means except a least significant bit, and outputting the held digital data signal as a digital data signal from an output node group connected to corresponding output terminal group; wherein the first input node group and the second input node group of the adding means of the respective computing means having the different numbers to each other, the sum of each input node group number being twice of the output node group number of corresponding hold means.

According to further aspect of the invention, a data interpolating circuit comprises: a first and a second input terminal groups for individually receiving two inputted m-bit digital data signals; $2^k$ (k is an integer) output terminal groups for outputting the m-bit digital data signals respectively; a first hold means for temporarily holding the digital data signal received by the first input terminal group and outputting the digital data signal as a 0-th digital data signal from an output node group connected to the 0-th output terminal group; a second hold means for temporarily holding the digital data signal received by the second input terminal group and outputting the digital data signal as a $2^k$-th digital data signal from an output node group connected to the $2^k$-th output terminal group; and ($2^k$–1) (k is an integer and has the same value as that of mentioned above) computing means provided corresponding to the first ~($2^k$–1) output terminal groups.

Wherein, the respective computing means has an adding means and an hold means, the adding means having a first input node group and a second input node group for receiving digital data signals respectively for adding the two digital data signals inputted into the first input node group and the second input node group and outputting the addition result, and the hold means for temporarily holding an m-bit digital data signal among the addition result received from the adding means except a least significant bit, and outputting the held digital data signal as a digital data signal from an output node group connected to corresponding output terminal group; wherein the first input node group of the adding means of the respective computing means being connected to either one of the output node groups of the first hold means for outputting the 0-th digital data signal or the output node group of the second hold means for outputting the $2^k$-th digital data signal; the second input node group being connected to an output node group of the hold means for outputting a digital data signal, whose group number is obtained by subtracting the first input node group number from the twice of the output node group number of the corresponding hold means.

According to further aspect of the invention, a data interpolating circuit comprises: a first input terminal group and a second input terminal group for individually receiving two different m-bit digital data signals; $2^k$ (k is an integer) output terminal groups for outputting the m-bit digital data signals respectively; first hold means for temporarily holding the digital data signal received by the first input terminal group and outputting the digital data signal as a 0-th digital data signal from an output node group connected to the 0-th output terminal group; a second hold means for temporarily holding the digital data signal received by the second input terminal group and outputting the digital data signal as a $2^k$-th digital data signal from an output node group connected to the $2^k$-th output terminal group; and stages of computing portions (k is an integer and has the same value mentioned above).

Wherein, the computing portion of the first stage has a computing means comprising an adding means and a hold means, the adding means comprising a first input node group connected to the output node group of the first hold means and a second input node group connected to the output node group of the second hold means for adding two digital data signals inputted into the first input node group and the second input node group and outputting the addition result, and the hold means for temporarily holding m-bit digital data signal of the addition result received from the adding means except the least significant bit and outputting the held digital data signal from an output node group; each computing portions of a half of the second stages and after comprises an adding means and a hold means; the adding means comprising a first input node group connected to the output node group of the first hold means and a second input node group connected to the output node group of the hold means in one of the computing means in the computing portion of the preceding stage, the adding means for adding two digital data signals inputted into the first input node group and the second input node group, and the hold means for temporarily holding an m-bit digital data signal of the addition result received from the adding means except the least significant bit and for outputting the held digital data signal from the output node group.

And the respective computing mean in each computing portions of the rest half of the second stages and after thereof have respective adding means and hold means, the adding means having a first input node group connected to the output node group of one of the hold means in the computing means of the preceding stage and a second node group connected to the output node group of one of the hold means in the different computing means of the preceding stage, the adding means for adding two digital data signals inputted into the first input node group and the second input node group and outputting the addition result, and the hold means for temporarily holding m-bit digital data signal of the addition result received from the adding means except the least significant bit and for outputting the held digital data signal from output node groups; and output node groups of the hold means of the respective computing means are connected to the output terminal groups corresponding to the first ~($2^k$–1)-th output node groups.

According to further aspect of the invention, a data interpolating circuit comprises: a first input terminal group and a second input terminal group for individually receiving two different m-bit digital data signals; 0-th~fifteenth output terminal groups for outputting the m-bit digital data signals respectively; a 0-th hold means having a input node groups connected to the first input terminal group and an output node group connected to the 0-th output terminal group; a sixteenth hold means having a input node groups connected to the second input terminal group; and first to fourth stages of computing means.

The first stage of the computing means comprises an eighth computing means comprising an adding means having a first input node group connected to the output node group of the 0-th hold means and a second input node group connected to the output node group of the sixteenth hold means, and a hold means for temporarily holding an m-bit digital data signal of the addition result received from the adding means except the least significant bit and outputting the held digital data signal from an output node group to the eighth output terminal group.

The second stage of the computing means comprises a fourth computing means comprising an adding means having a first input node groups connected to the output node group of the 0-th hold means and a second input node group connected to the output node group of the hold means of the eighth computing means, and a hold means for temporarily holding an m-bit digital data signal of the addition result received from the adding means except the least significant bit and outputting the held digital data signal from an output node group to the fourth output terminal group; a twelfth computing means comprising an adding means having a first input node group connected to the output node group of the hold means of the eighth computing means and a second input node group connected to the output node group of the sixteenth hold means, and a hold means for temporarily holding an m-bit digital data signal of the addition result received from the adding means except the least significant bit and outputting the held digital data signal from an output node group to the twelfth output terminal group.

The third stage of the computing means comprises a second computing means comprising an adding means having a first input node group connected to the output node group of the 0-th hold means and a second input node group connected to the output node group of the hold means of the fourth computing means, and a hold means for temporarily holding an m-bit digital data signal of the addition result received from the adding means except the least significant bit and outputting the held digital data signal from an output node group to the second output terminal group; a sixth computing means comprising an adding means having a first input node group connected to the output node group of the 0-th hold means and a second input node group connected to the output node group of the hold means of the twelfth computing means, and a hold means for temporarily holding an m-bit digital data signal of the addition result received from the adding means except the least significant bit and outputting the held digital data signal from an output node group to the sixth output terminal group; a tenth computing means comprising an adding means having a first input node group connected to the output node group of the hold means of the fourth computing means and a second input node group connected to the output node group of the sixteenth hold means, and a hold means for temporarily holding an m-bit digital data signal of the addition result received from the adding means except the least significant bit and outputting the held digital data signal from an output node group to the tenth output terminal group; a fourteenth computing means comprising an adding means having a first input node group connected to the output node group of the hold means of the twelfth computing means and a second input node group connected to the output node group of the sixteenth hold means, and a hold means for temporarily holding an m-bit digital data signal of the addition result received from the adding means except the least significant bit and outputting the held digital data signal from an output node group to the fourteenth output terminal group.

The fourth stage of the computing means comprises a first computing means comprising an adding means having a first input node group connected to the output node group of the 0-th hold means and a second input node group connected to the output node group of the hold means of the second computing means, and a hold means for temporarily holding an m-bit digital data signal of the addition result received from the adding means except the least significant bit and outputting the held digital data signal from an output node group to the first output terminal group; a third computing means comprising an adding means having a first input node group connected to the output node group of the 0-th hold means and a second input node group connected to the output node group of the hold means of the sixth computing means, and a hold means for temporarily holding an m-bit digital data signal of the addition result received from the adding means except the least significant bit and outputting the held digital data signal from an output node group to the third output terminal group; a fifth computing means comprising an adding means having a first input node group connected to the output node group of the 0-th hold means and a second input node group connected to the output node group of the hold means of the tenth computing means, and a hold means for temporarily holding an m-bit digital data signal of the addition result received from the adding means except the least significant bit and outputting the held digital data signal from an output node group to the fifth output terminal group; a seventh computing means comprising an adding means having a first input node group connected to the output node group of the 0-th hold means and a second input node group connected to the output node group of the hold means of the fourteenth computing means, and a hold means for temporarily holding an m-bit digital data signal of the addition result received from the adding means except the least significant bit and outputting the held digital data signal from an output node group to the seventh output terminal group; a ninth computing means comprising an adding means having a first input node group connected to the output node group of the hold means of the second computing means and a second input node group connected to the output node group of the sixteenth hold means, and a hold means for temporarily holding an m-bit digital data signal of the addition result received from the adding means except the least significant bit and outputting the held digital data signal from an output node group to the ninth output terminal group; an eleventh computing means comprising an adding means having a first input node group connected to the output node group of the hold means of the sixth computing means and a second input node group connected to the output node group of the sixteenth hold means, and a hold means for temporarily holding an m-bit digital data signal of the addition result received from the adding means except the least significant bit and outputting the held digital data signal from an output node group to the eleventh output terminal group; a thirteenth computing means comprising an adding means having a first input node group connected to the output node group of the hold means of the tenth computing means and a second input node group connected to the output node group of the sixteenth hold means, and a hold means for temporarily holding an m-bit digital data signal of the addition result received from the adding means except the least significant bit and outputting the held digital data signal from an output node group to the thirteenth output terminal group; and a fifteenth computing means comprising an adding means having a first input node group connected to the output node group of the hold means of the fourteenth computing means and a second input node group connected to the output node group of the sixteenth hold means, and a hold means for temporarily holding an m-bit digital data signal of the addition result received from the adding means except the least significant bit and outputting the held digital data signal from an output node group to the fifteenth output terminal group.

According to further aspect of the invention, a data signal supply circuit comprises: m input terminals provided corresponding to respective bits of m-bit PCM code modulation signal; a plurality of D-type flip-flops of a first stage corresponding to the m input terminals, wherein each data input terminal is connected to the m input terminals and a clock signal is applied to a clock input terminal; a plurality of D-type flip-flops of a second stage provided corresponding to the plurality of D-type flip-flops of the first stage, wherein respective data input terminals being connected to the output terminals of the corresponding D-type flip-flops of the first stage and clock signal is applied to respective clock input terminals; a plurality of first data signal output terminals provided corresponding to the plurality of D-type flip-flops of the first stage and connected to the respective output terminals of the corresponding D-type flip-flops of the first stage; and a plurality of second data signal output terminals provided corresponding to the plurality of D-type flip-flops of the second stage and connected to respective output terminals of the corresponding D-type flip-flops of the second stage.

According to further aspect of the invention, a data signal supply circuit comprises: m input terminals provided corresponding to respective bits of m-bit PCM code modulation signal; a plurality of D-type flip-flops of a first stage corresponding to the m input terminals, wherein each data input terminal is connected to the m input terminals and a clock signal is applied to a clock input terminal; a plurality of D-type flip-flops of a second stage provided corresponding to the plurality of D-type flip-flops of the first stage, wherein respective data input terminals being connected to the output terminals of the corresponding D-type flip-flops of the first stage and inverted clock signal is applied to respective clock input terminals; a plurality of first data signal output terminals provided corresponding to the plurality of D-type flip-flops of the first stage and connected to the respective output terminals of the corresponding D-type flip-flops of the first stage; and a plurality of second data signal output terminals provided corresponding to the plurality of D-type flip-flops of the second stage and connected to respective output terminals of the corresponding D-type flip-flops of the second stage.

BRIEF DESCRIPTION OF THE DRAWINGS

FIGS. 7A–7E show a timing chart of signals at respective portions in a first data signal supply circuit.

FIGS. 9A–9E show a timing chart for signals at respective portions in a second data signal supply circuit.

FIG. 14 illustrates computing processes, theoretical values, output results, and maximal errors for respective output data of a first embodiment of the present invention.

DETAILED DESCRIPTION OF THE PREFERRED EMBODIMENTS

Embodiment 1

A first embodiment of the present invention is explained using FIGS. 1~14. First, a location of a sixteen-times data interpolating circuit in the first embodiment of the present invention is explained using FIG. 1.

Figure 1:
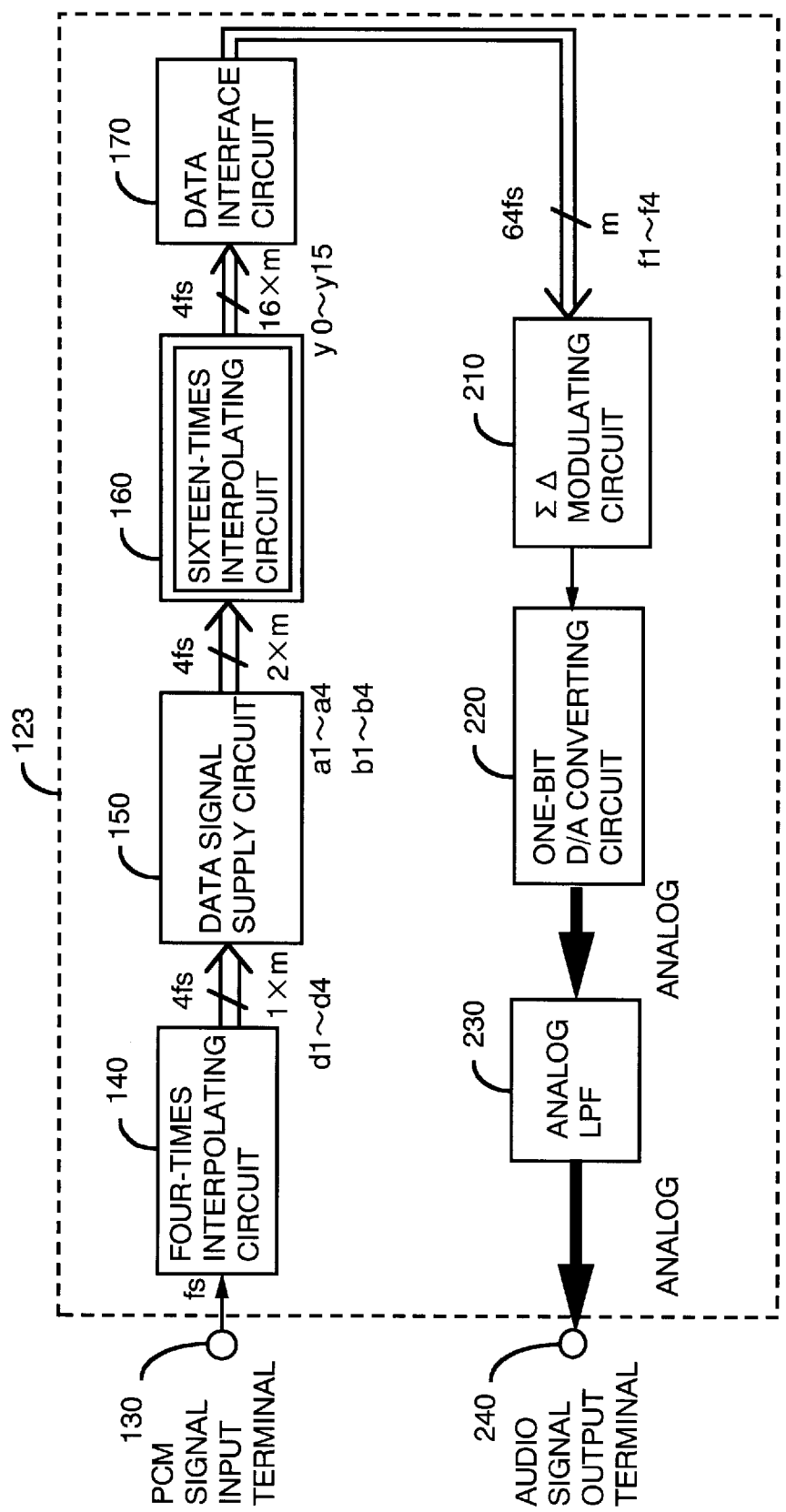
FIG. 1 shows a location of a sixteen-times data interpolating circuit of the present invention in a D/A converting portion.

FIG. 1 is a block diagram of a sixty-four-times fs (fs: sampling frequency) digital/analog (D/A) converting portion. The sixty-four-times fs digital/analog (D/A) converting portion operates in the same way as the digital/analog (D/A) converting portion 123 shown in FIG. 16 such as interpolating the digital data signal received from the de-emphasis circuit 122, converting the digital data signal to an analog signal, and then outputting the analog signal as an audio signal. The sixty-four-times fs digital/analog (D/A) converting portion in FIG. 1 differs from the digital/analog (D/A) converting portion 123 shown in FIG. 16 in that the former is interpolated by sixty-four-times while the latter is interpolated by four-times.

In FIG. 1, the digital/analog (D/A) converting portion 123 has a signal input terminal 130 into which a pulse code modulation (PCM) signal of the sampling frequency fs is inputted. The PCM signal is a digital signal having a predetermined number of bits (4 bits in this embodiment for simplification of explanation. In general, 16 bits for digital audio signal).

The digital/analog (D/A) converting portion 123 comprises a four-times data interpolating circuit 140 for receiving the PCM code modulation signal inputted from the signal input terminal 130, generating a four-times PCM code modulation signal, and then outputting the PCM code modulation signal of a frequency which is four-times of the sampling frequency fs (the number of bits m is four from d1 to d4 in FIG. 1). The digital/analog (D/A) converting portion 123 also has a data signal supply circuit 150 for successively taking in the PCM code modulation signal from the four-times data interpolating circuit in synchronism with a clock signal (with its frequency 4 fs which is four-times of the sampling frequency fs), and then outputting successively-inputted two PCM code modulation signals (shown as four bits of (a1~a4) and four bits of b1~b4 in FIG. 1) as digital data signals. A concrete example of operation of the four-times data interpolating circuit 140 and the data signal supply circuit 150 is explained later.

The digital/analog (D/A) converting portion 123 also includes a sixteen-times data interpolating circuit 160 for receiving the two different successive digital data outputted from the data signal supply circuit 150, and for generating sixteen-times digital data signal (shown as y0~y15 each comprising m bits (four bits) in FIG. 1) based on the two different received digital data signals, namely, for generating new fifteen digital data by linearly approximating the interval between the two digital data, and outputting the digital data, which is explained later in detail.

The digital/analog (D/A) converting portion 123 has a data interface circuit 170 for receiving the digital data signals y0~y15 from the sixteen-times data interpolating circuit 160, and outputting digital data signals f1~f4 in serial in synchronism with a clock signal (substantially sixty-four-times (4×16) of the sampling frequency fs). The PCM code modulation signal having the sampling frequency fs inputted into the signal input terminal 130 is multiplied by 64, in other words, 63 PCM code modulation signals is interpolated, and then digital data signals (shown as four bits f1~f4 in FIG. 1), whose frequency 64 fs is 64 (4×16) times of the sampling frequency fs are outputted from the output of the data interface circuit 170. A concrete example of this operation is explained later.

The digital/analog (D/A) converting portion 123 further comprises a ΣΔ modulating circuit 210 for ΣΔ modulating the digital data signal received from the data interface circuit and for outputting the digital data signal as one-bit data signal, a one-bit digital/analog (D/A) converting circuit 220 for one-bit D/A converting the data signal received from the ΣΔ modulating circuit and for outputting the data signal as an analog signal, and an analog low-path filter (LPF) 230 for removing high-frequency components of the analog signal received from the D/A converting circuit 220 and for outputting the analog signal to an audio signal output terminal 240 as an analog audio signal.

Figure 2:
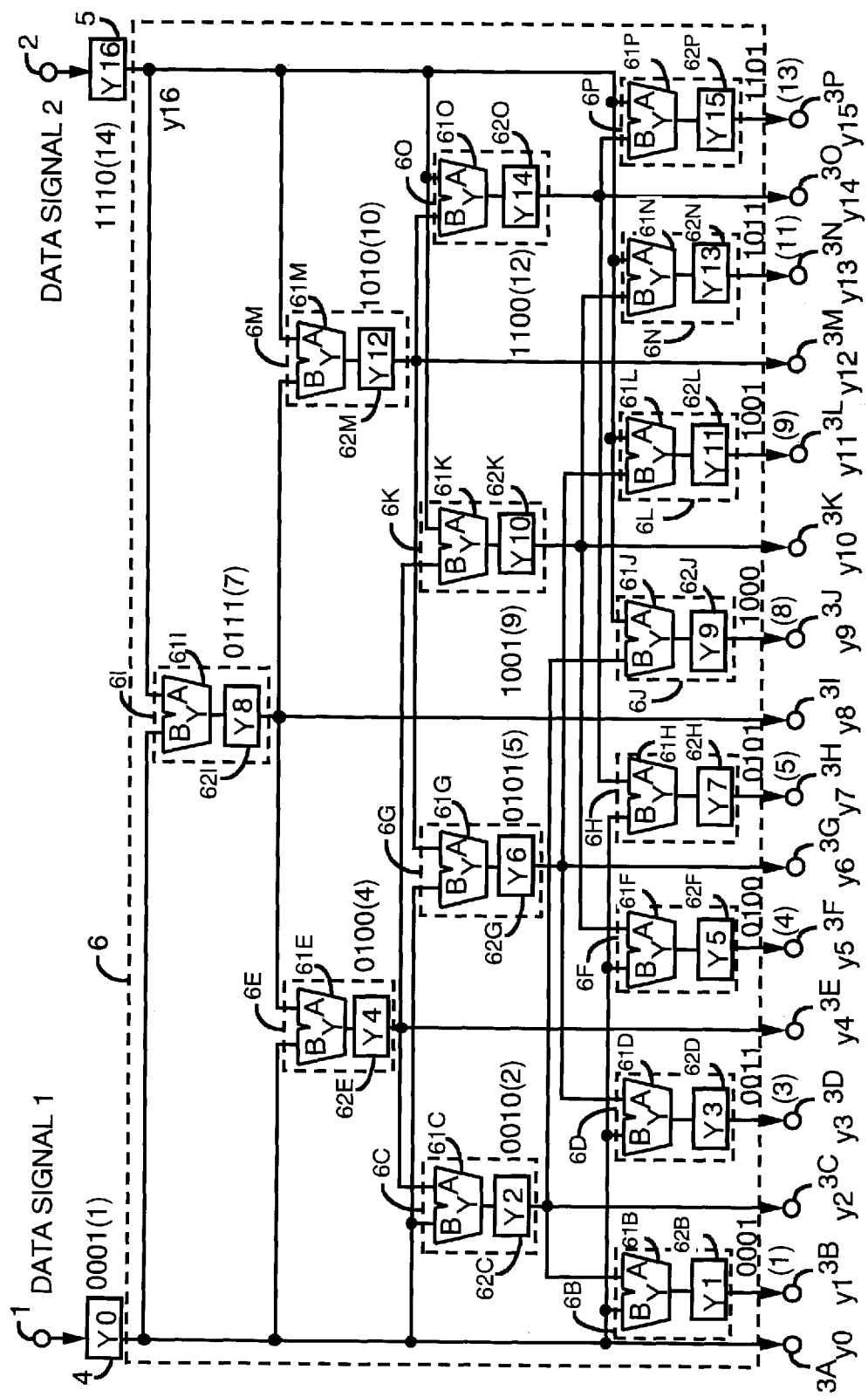
FIG. 2 is a block diagram which shows a sixteen-times data interpolating circuit of a first embodiment of the present invention.

The sixteen-times data interpolating circuit 160 which mainly characterizes the first embodiment of the present invention is further explained below using FIG. 2. In FIG. 2, the first group of input terminal 1 and the second input terminal group 2, simultaneously and individually receive two m-bit digital data signals serially outputted from the data signal supply circuit 150 (number m is equal to 4 hereinafter in this example for the convenience of explanation). Respective groups of input terminals 1, 2 comprise as many input terminals as the number of bits of the digital data signals, namely m input terminals. In the example shown in FIG. 2, a 4-bit digital data signal 1 of 0001 (1 in the decimal system) is inputted into the first input terminal group 1, while a 4-bit digital data signal 2 of 1110 (14 in the decimal system) is inputted into the second input terminal group 2. $2^k$ output terminal groups 3A~3P (0~($2^k$−1)) (k is an integral number and is equal to 4 hereinafter in this example since the sixteen-times data interpolating circuit is used) respectively output m-bit digital data signals y0~y15. Respective output terminal groups 3A~3P comprise as many output terminals as the number of bits of the digital data signals, namely, m output terminals.

Figure 3:
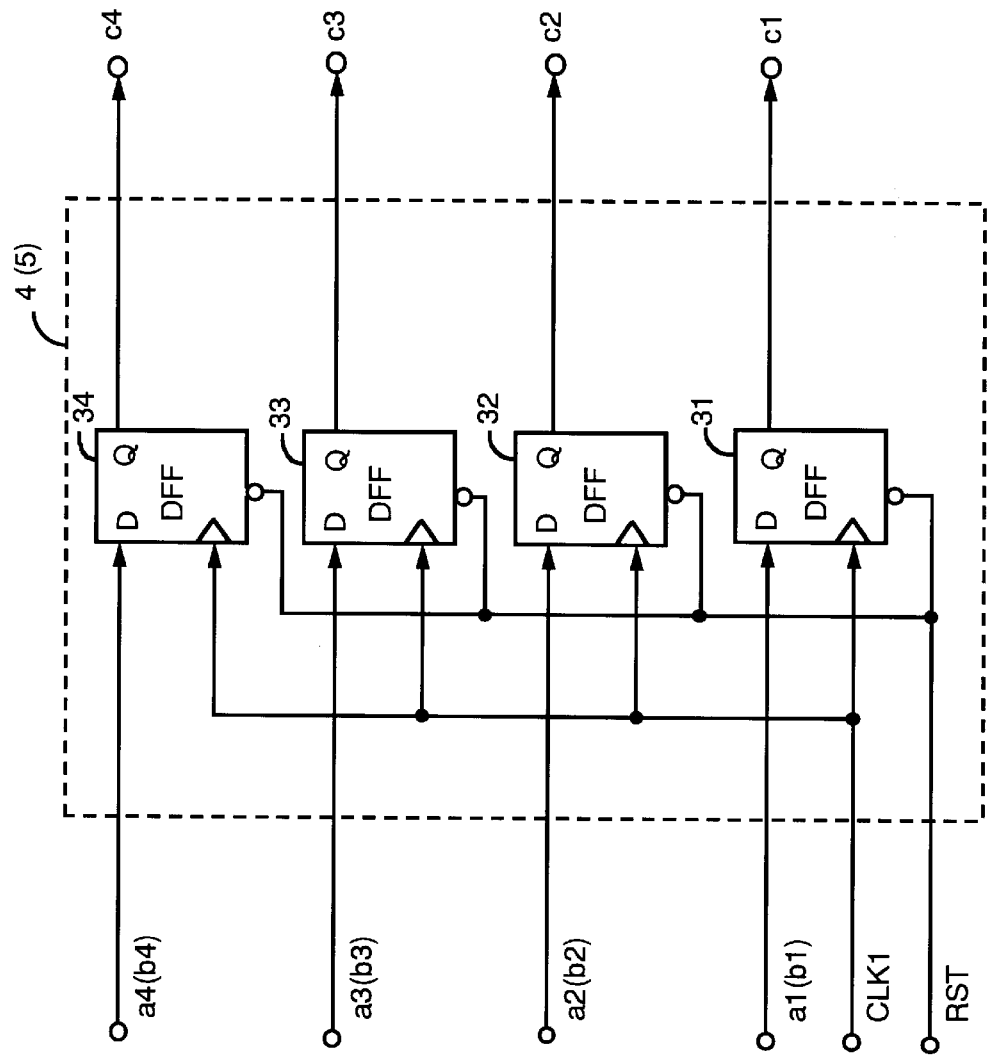
FIG. 3 shows an example of a configuration of hold circuits (Y0, Y16) for holding inputted parallel data.
Figure 4:
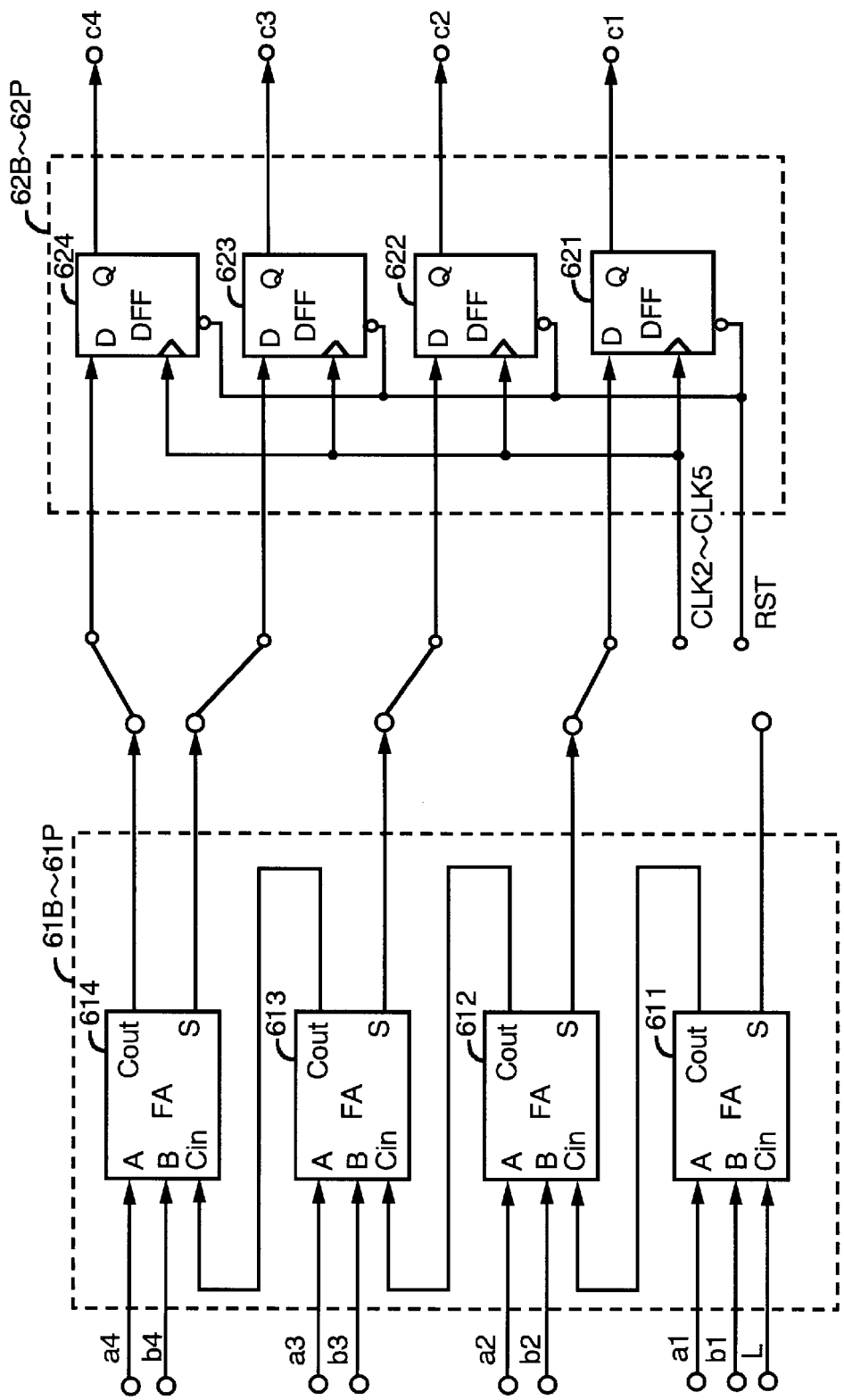
FIG. 4 shows an example of a configuration of computing circuits (6B~6P) for computing a mid point of two inputted signals.
Figure 5:
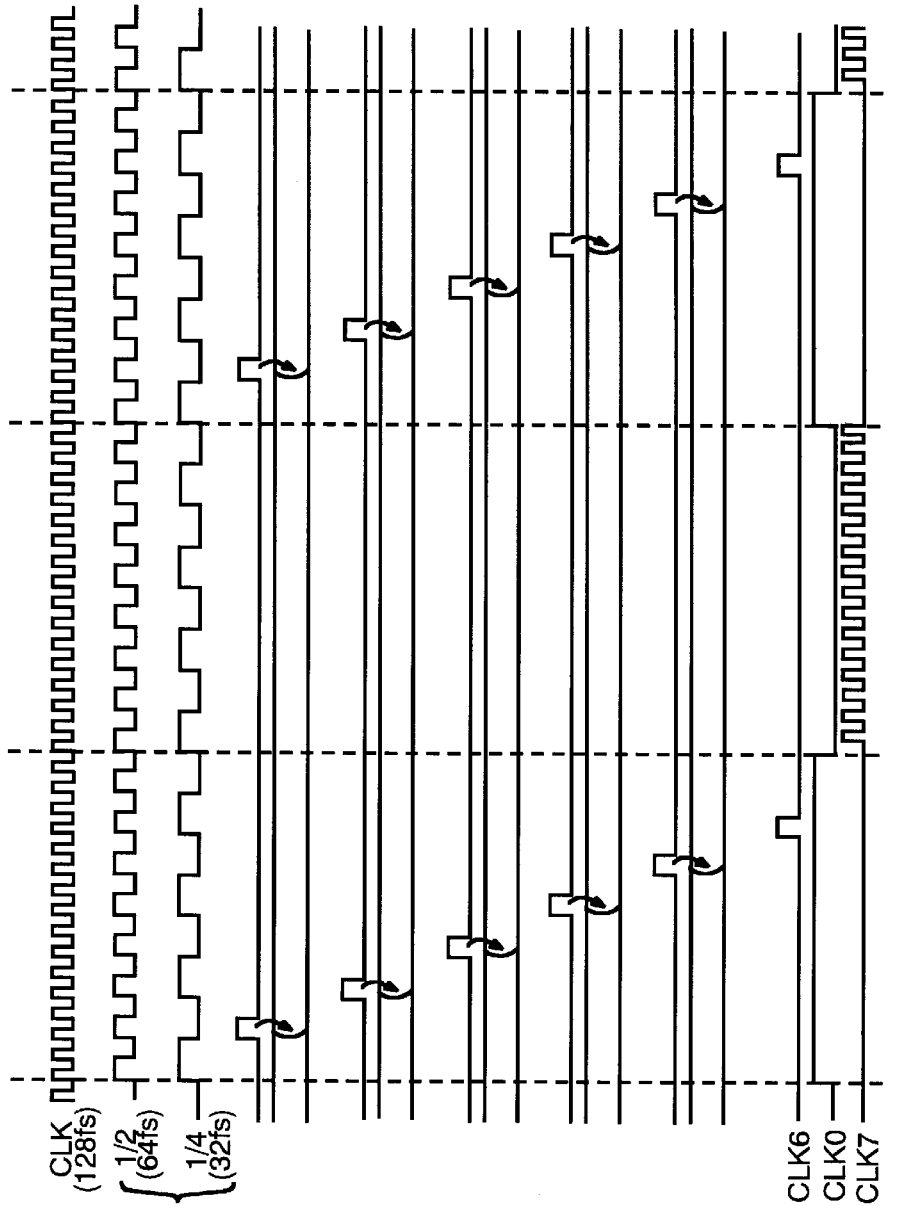
FIGS. 5A–5J show a timing chart for master clock (CLK), dividing clock, latch clock, and interpolating data reading signal.

A first hold means 4 temporarily holds the digital data signal 1 received at the first input terminal group 1 in synchronism with a clock signal CLK1 (frequency 4 fs which is four-times of the sampling frequency fs) shown in FIG. 5C. Then, the first hold means 4 outputs the digital data signal 1 from an output node groups as the 0-th digital data signal y0. Here, the output node group is connected to the 0-th output terminal group 3A. An example of the first hold means 4 is shown in FIG. 3. In FIG. 3, the first hold means 4 has m D flip-flops (four D flip-flops in this example) 31~34, each is provided corresponding to respective bits of the digital data signal 1. Each D flip-flop has an input terminal D connected to the corresponding input node of the input node groups and an output terminal Q connected to the corresponding output node of the output node groups. Each D flip-flop has a clock input terminal for receiving the clock signal CLK1 and a reset terminal for receiving a reset signal RST. The D flip-flop takes the data inputted into the input terminal D in response to a rise of the clock signal CLK and outputs the data from the output terminal Q. Receiving the reset signal RST, the D flip-flop resets the contents held by the each flip-flop. In other words, the output from the output terminal is reset.

Back to FIG. 2 again, a second hold means 5 temporarily holds the digital data signal 2 received at the second input terminal group 2 in synchronism with the clock signal CLK1. Then, the second hold means 5 outputs the digital data signal 2 from an output node groups as a $2^k$-th digital data signal (a sixteenth digital data signal in this example). The second hold means 5 has a same circuit configuration as that of the first hold means 4, which comprises m D flip-flops (four D flip-flops in this example) 31~34, each corresponds to a respective bit of the digital data signal 2.

An interpolated data generating means 6 comprises ($2^k$−1) computing means 6B~6P provided corresponding to the first ~($2^k$−1)-th output terminal groups 3B~3P. The respective computing means 6B~6P comprise adding means 61B~61P and hold means 62B~62P. The respective adding means 61B~61P add inputted two digital data signals and output resultant sum. The respective hold means 62B~62P temporarily hold m-bit digital data signal of the sum from the corresponding adding means 61B~61P except the least significant bit, and output the held digital data signal through the output node groups to the corresponding output terminal groups 3B~3P.

The respective adding means 61B~61P of the respective computing means 6B~6P of the interpolated data generating means 6 comprises a first input node group comprising first input nodes a1~a4 each for receiving a bit of one of the two input digital data signals, a second input node group comprising second input nodes b1~b4 each for receiving a bit of the other digital data signal, and m full adders (FAs) 611~614 (four full adders in the present example), each is provided corresponding to respective bits of the input digital data signal.

The respective full adders 611~614 have first input terminals A respectively connected to the first input nodes a1~a4 of the corresponding bits of the first input node group, and second input terminals B connected to the second input nodes b1~b4 of the corresponding bits of the second input node group, where carry signal is inputted into carry input terminal Cin, the bits of the sum except the most significant bit (MSB) are outputted from sum terminal S as addition result, and the most significant bit MSB of the sum is outputted from carry out terminal Cout as a carry signal.

Then, a ground potential of low (L) level indicating "0" is applied to the carry input terminal Cin of the full adder 611 on the first stage. The carry-in terminals Cin of the full adders 612~614 on the stages after the first stage are connected to the carry out terminals Cout of the full adders on the preceding stages. Outputs of the sum terminals S of the full adders 611~614 and the carry-out terminal Cout on the last stage indicate the addition results of the two input digital data signals. The outputs of the sum terminals of the full adders 612~614 except the full adder 611 on the first stage and the output of the carry-out terminal Cout of the full adder 614 on the last stage, in other words, the m-bit digital data signal of the a significant bit, indicate least significant bit, indicates m-bit digital data signal which shows a mid-value of the sum of the two input digital data signals.

Furthermore, the hold means 62B~62P of the respective computing means 6B~6P of the interpolated data generating means 6 have m D flip-flops 621~624 (four D flip-flops in this example), which are corresponding to the respective bits of the m-bit digital data signal of the addition result outputted from the corresponding adding means 61B~61P except the least significant bit. Respective D flip-flops 621~624 have input terminals D connected to the output nodes which correspond to the bits of the digital data signal outputted from the adding means 61B~61P. Output terminals Q are connected to the corresponding output nodes of the output node groups connected to the corresponding output terminals 3B~3P. One of clock signals CLK 2~5 is applied to clock input terminals, while reset signals RST are applied to reset terminals. Each D flip-flop takes in data inputted into the input terminals D in response to rise of the clock signals CLK 2~5 and outputs the taken-in data from the output terminals Q. The D flip-flop then reset the outputs from the output terminals Q, in response to the reset signals RST.

Connections of the first and the second input node groups of the full adders 611~614 in the computing means 6B~6P included in the interpolated data generating means 6 are explained below.

As explained above, output terminals 3A~3P corresponding to the $2^k$ groups are numbered as $0$~$(2^k-1)$. And, the computing means 6B~6P and digital data signals $y1$~$y(2^k-1)$, outputted from the computing means 6B~6P which correspond to the first ~$(2^k-1)$-th output terminal groups 3B~3P, are also numbered as first ~$(2^k-1)$ corresponding to the output terminal groups 3B~3P. The digital data signal y0 outputted from the first hold means 4 is numbered as 0-th, and the digital data signal $y(2^k-1)$ outputted from the hold means 62P of the $(2^k-1)$-th computing means 6P is numbered as $2^k-1$. The connections are explained below based on the above definition.

In other words, the first and the second input node groups (a1~a4, b1~b4) (differently numbered from each other) of the full adders 611~614 in the respective computing means 6B~6P are connected to the output node group (c1~c4) of the corresponding hold means 62B~62. The desired hold means 62B~62 are selected such that the twice of the number of the output node group (c1~c4) of the means 62B~62P equals to the sum of the respective numbers of the input node groups (a1~a4 and b1~b4).

In this example, the first input node group (a1~a4) of the adding means 61B~61P in the respective computing means 6B~6P are connected to the output node group (c1~c4) of one of the first hold means 4 for outputting the 0-th digital data signal y0 or the second hold means 5 for outputting the $2^k$-th digital data signal. The second input node group (b1~b4) is connected to the output node group (c1~c4) of the hold means 62B~62P of the computing means 6B~6P. The desired hold means 62B~62 are selected such that the twice of the number of the output node group (c1~c4) of the means 62B~62P equals to the sum of the respective numbers of the input node groups (a1~a4 and b1~b4).

Furthermore, the respective computing means 6B~6P are connected so that a digital data signal $y_i$ outputted from an i-th computing means is calculated as follows.

$$y_i = \{y_0 + y_{(2i)}\}/2 \quad \text{(in case } i \geq 2^k - 1\text{)} \tag{1}$$

$$y_i = \{y(2i - 2^k) + y(2^k)\}/2 \quad \text{(in case } i > 2^k - 1\text{)} \tag{2}$$

Here, the digital data signal $y_i$ is rounded off by the predetermined finite number of digits, and the computed result is outputted from the computing means 6B~6P.

It is also thought in the following way. The interpolated data generating means 6 has n stages of computing portions and the computing portion on the first stage has a computing means 6I. An adding means 61I in the computing means 6I has the first input node group (a1~a4) connected to the output node group (c1~c4) of the first hold means 4, and the second input node group (b1~b4) connected to the output node group (c1~c4) of the second hold means 5. The full adders in the respective computing means after the first stage have the first input node group (a1~a4) connected to the output node group (c1~c4) of the first hold means 4, and the second input node group (b1~b4) connected to the output terminal group c1~c4 of the hold means of one of the computing means of the computing portion on the preceding stage. The full adders of the remaining computing means have the first input node group (a1~a4) connected to the output node group (c1~c4) of the second hold means 5, and the second input node group (b1~b4) connected to the output node group (c1~c4) of one of the hold means of the computing means in the computing portion on the preceding stage.

Based on the way of thinking mentioned above, one example is concretely explained below where the number k is equal to 4, in other words, in case of a sixteen-times ($=2^4$) data interpolating circuit. Where, the digital data signals y1~y15 outputted from the respective computing means 6B~6P are explained base on the assumption that the 4-bit digital data signal 1 of 0001 (1 in decimal system) is inputted into the first input terminal group 1, and the 4-bit digital data signal 2 of 1110 (14 in decimal system) is inputted into the second input terminal group 2.

The eighth computing means 6I is connected as explained below. The first input node group (a1~a4) of the adding means 61I is connected to the output node group (c1~c4) of the first hold means 4 (which corresponds to the 0-th hold means). The second input node group (b1~b4) is connected to the output node group (c1~c4) of the second hold means 5 (which corresponds to the sixteenth hold means). The output node group (c1~c4) of the hold means 62I is connected to the eighth output terminal group 3I. The adding means 61I adds the inputted 4-bit digital data signal 0001 (1 in decimal system) to the inputted 4-bit digital data signal 1110 (14 in decimal system) to obtain 11111 (31 in decimal system). The hold means 62I discards a least significant bit from the addition result to obtain a 4-bit digital data signal 0111 (7 in decimal system). The hold means 62I receives the digital data signal 0111 in response to rise of a clock signal CLK2 shown in FIG. 5D, and outputs the digital data signal to the eighth output terminal group 3I. Here, the clock signal CLK2 has a frequency 4 fs which is four-times of the sampling frequency fs and delays by 1/16 cycles of the clock signal CLK1 inputted into the first and the second hold means 4, 5, for example.

The fourth computing means 6E is connected as explained below. The first input node group (a1~a4) of an adding means 61E is connected to the output node group (c1~c4) of the first hold means 4. The second input node group (b1~b4) is connected to the output node group (c1~c4) of the hold means 62I of the eighth computing means 6I. The output node group (c1~c4) of the hold means 62E is connected to the fourth output terminal group 3E. The adding means 61E adds an inputted 4-bit digital data signal 0001 (1 in decimal system) to an inputted 4-bit digital data signal 0111 (7 in decimal system) to obtain 01000 (8 in decimal system). The hold means 62E receives a 4-bit digital data signal 0100 (4 in decimal system), which is obtained by discarding the least significant bit of the addition result, at rise of a clock signal CLK3 shown in FIG. 5E. The hold means 62E outputs the digital data signal to the fourth output terminal group 3E. Here, the clock signal CLK3 has a frequency 4 fs which is four-times of the sampling frequency fs. The clock signal CLK3 delays by 1/16 cycles of the clock signal CLK2, for example.

The 12th computing means 6M is connected as explained below. The first output node group (a1~a4) of the adding means 61M is connected to the output node group (c1~c4) of the hold means 62I of the eighth computing means 6I. The second input node group (b1~b4) is connected to the output node group (c1~c4) of the second hold means 5. The output node group (c1~c4) of the hold means 62M is connected to the twelfth output terminal group 3M. The adding means 61M adds the inputted 4-bit digital data signal 0111 (7 in decimal system) to the inputted 4-bit digital data signal 1110 (14 in decimal system) to obtain 1010 1(21 in decimal system). The hold means 62M receives a 4-bit digital data signal 1010 (10 in decimal system) which is obtained by discarding the least significant bit of the addition result at rise of the clock signal CLK3, and outputs the digital data signal 1010 to the twelfth output terminal group 3M.

A second computing means 6C is connected as explained below. The first input node group (a1~a4) of the adding means 61C is connected to the output node group (c1~c4) of the first hold means 4. The second input node group (b1~b4) is connected to the output node group (c1~c4) of the hold means 62E of the fourth computing means 6E. The output node group (c1~c4) of the hold means 62C is connected to the second output terminal group 3C. The adding means 61C adds an inputted 4-bit digital data signal 0001 (1 in decimal system) to an inputted 4-bit digital data signal 0100 (4 in decimal system) to obtain 00101 (5 in decimal system). The hold means 62C receives a 4-bit digital data signal 0010 (2 in decimal system), which is obtained by discarding the least significant bit of the addition result, at rise of a clock signal CLK4 shown in FIG. 5F. The hold means 62C outputs the digital data signal 0010 to the second output terminal group 3C. Here, the clock signal CLK4 has a frequency 4 fs which is four-times of the sampling frequency fs. The clock signal CLK4 delays by 1/16 cycles from the clock signal CLK3, for example.

The sixth computing means 6G is connected as explained below. The first input node group (a1~a4) of the adding means 61G is connected to the output node group (c1~c4) of the first hold means 4. The second input node group (b1~b4) is connected to the output node group (c1~c4) of the hold means 62M of the twelfth computing means 6M. The output node group (c1~c4) is connected to the output terminal group 3G. The adding means 61G adds an inputted 4-bit digital data signal 0001 (1 in decimal system) to an inputted 4-bit digital data signal 1010 (10 in decimal system) to obtain 01011 (13 in decimal system). The hold means 62G receives a 4-bit digital data signal 0101 (5 in decimal system) which is obtained by discarding the least significant bit of the addition result, at rise of the clock signal CLK4 shown in FIG. 5F. The hold means 62G then outputs the digital data signal 0101 to the sixth output terminal group 3G.

The tenth computing means 6K is connected as explained below. The first input node group (a1~a4) of an adding means 61K is connected to the output node group (c1~c4) of the hold means 62E of the fourth computing means 6E. The second input node group (b1~b4) is connected to the output node group (c1~c4) of the second hold means 5. The output node group (c1~c4) of the hold means 62K is connected to the tenth output terminal group 3K. The adding means 61K adds an inputted 4-bit digital data signal 0100 (4 in decimal system) to an inputted 4-bit digital data signal 1110 (14 in decimal system) to obtain 10010 (20 in decimal system). The hold means 62K receives a 4-bit digital data signal 1001 (9 in decimal system), which is obtained by discarding the least significant bit of the addition result, at rise of the clock signal CLK4. The hold means 62K then outputs the digital data signal 1001 to the tenth output terminal group 3K.

The fourteenth computing means 6O is connected as explained below. The first input node group (a1~a4) of the adding means 61O is connected to the output node group (c1~c4) of the hold means 62M of the twelfth computing means 6M. The second input node group (b1~b4) is connected to the output node group (c1~c4) of the second hold means 5. The output node group (c1~c4) of the hold means 62O is connected to the fourteenth output terminal group 3O. The adding means 61O adds an inputted 4-bit digital data signal 1010 (10 in decimal system) to an inputted 4-bit digital data signal 1110 (14 in decimal system) to obtain 11000 (24 in decimal system). The hold means 62O receives a 4-bit digital data signal 1100 (12 in decimal system), which is obtained by discarding the least significant bit of the addition result, at rise of the clock signal CLK4. The hold means 62O then outputs the digital data signal 1100 to the fourteenth output terminal group 3O.

The first computing means 6B is connected as explained below. The first input node group (a1~a4) of the adding means 61B is connected to the output node group (c1~c4) of the first hold means 4. The second input node group (b1~b4) is connected to the output node group (c1~c4) of the hold means 62C of the second computing means 6C. The output node group (c1~c4) of the hold means 62B is connected to the first output terminal group 3B. The adding means 61B adds an inputted 4-bit digital data signal 0001 (1 in decimal system) to an inputted 4-bit digital data signal 0010 (2 in decimal system) to obtain 00011 (3 in decimal system). The hold means 62B receives a 4-bit digital data signal 0001 (1 in decimal system), which is obtained by discarding the least significant bit of the addition result, at rise of a clock signal CLK5 shown in FIG. 5G. The hold means 62B then outputs the digital data signal 0001 to the first output terminal group 3B. Here, the clock signal CLK5 has a frequency 4 fs which is four-times of the sampling frequency fs. The clock signal CLKS delays by $\frac{1}{16}$ cycles from the clock signal CLK4, for example.

The third computing means 6D is connected as explained below. The first input node group (a1~a4) of the adding means 61D is connected to the output node group (c1~c4) of the first hold means 4. The second input node group (b1~b4) is connected to the output node group (c1~c4) of the hold means 62G of the sixth computing means 6G. The output node group (c1~c4) of the hold means 62D is connected to the third output terminal group 3D. The adding means 61D adds an inputted 4-bit digital data signal 0001 (1 in decimal system) to an inputted 4-bit digital data signal 0101 (5 in decimal system) to obtain 00110 (6 in decimal system). The hold means 62D receives a 4-bit digital data signal 0011 (3 in decimal system), which is obtained by discarding the least significant bit of the addition result, at rise of the clock signal CLK5. The hold means 62D then outputs the digital data signal 0011 to the third output terminal group 3D.

The fifth computing means 6F is connected as explained below. The first input node group (a1~a4) of the adding means 61F is connected to the output node group (c1~c4) of the first hold means 4. The second input node group (b1~b4) is connected to the output node group (c1~c4) of the hold means 62K of the tenth computing means 6K. The output node group (c1~c4) of the hold means 62F is connected to the fifth output terminal group 3F. The adding means 61F adds an inputted 4-bit digital data signal 0001 (1 in decimal system) to an inputted 4-bit digital data signal 1001 (9 in decimal system) to obtain 01010 (10 in decimal system). The hold means 62F receives a 4-bit digital data signal 0101 (5 in decimal system), which is obtained by discarding the least significant bit of the addition result, at rise of the clock signal CLKS. The hold means 62F then outputs the digital data signal 0101 to the fifth output terminal group 3F.

The seventh computing means 6H is connected as explained below. The first input node group (a1~a4) of the adding means 61H is connected to the output node group (c1~c4) of the first hold means 4. The second input node group (b1~b4) is connected to the output node group (c1~c4) of the hold means 62O of the fourteenth computing means 6O. The output node group (c1~c4) of the hold means 62H is connected to the seventh output terminal group 3H. The adding means 61H adds an inputted 4-bit digital data signal 0001 (1 in decimal system) to an inputted 4-bit digital data signal 1100 (12 in decimal system) to obtain 01101 (13 in decimal system). The hold means 62H receives a 4-bit digital data signal 0110 (6 in decimal system), which is obtained by discarding the least significant bit of the addition result, at rise of the clock signal CLK5. The hold means 62H then outputs the digital data signal 0110 to the seventh output terminal group 3H.

The ninth computing means 6J is connected as explained below. The first input node group (a1~a4) of the adding means 61J is connected to the output node group (c1~c4) of the hold means 62C of the second computing means 6C. The second input node group (b1~b4) is connected to the output node group (c1~c4) of the second hold means 5. The output node group (c1~c4) of the hold means 62J is connected to the ninth output terminal group 3J. The adding means 61J adds an inputted 4-bit digital data signal 0010 (2 in decimal system) to an inputted 4-bit digital data signal 1110 (14 in decimal system) to obtain 10000 (16 in decimal system). The hold means 62O receives a 4-bit digital data signal 1000 (8 in decimal system), which is obtained by discarding the least significant bit of the addition result, at rise of the clock signal CLK5. The hold means 62O then outputs the digital data signal 1000 to the ninth output terminal group 3J.

The eleventh computing means 6L is connected as explained below. The first input node group (a1~a4) of the adding means 61L is connected to the output node group (c1~c4) of the hold means 62G of the sixth computing means 6G. The second input node group (b1~b4) is connected to the output node group (c1~c4) of the second hold means 5. The output node group (c1~c4) of the hold means 62L is connected to the eleventh output terminal group 3L. The adding means 61L adds an inputted 4-bit digital data signal 0101 (5 in decimal system) to an inputted 4-bit digital data signal 1110 (14 in decimal system) to obtain 10011 (19 in decimal system). The hold means 62L receives a 4-bit digital data signal 1001 (9 in decimal system), which is obtained by discarding the least significant bit of the addition result, at rise of the clock signal CLK5. The hold means 62L then outputs the digital data signal 1001 to the eleventh output terminal group 3L.

The thirteenth computing means 6N is connected as explained below. The first input node group (a1~a4) of the adding means 61N is connected to the output node group (c1~c4) of the hold means 62K of the tenth computing means 6K. The second input node group (b1~b4) is connected to the output node group (c1~c4) of the second hold means 5. The output node group (c1~c4) of the hold means 62N is connected to the thirteenth output terminal group 3N. The adding means 61N adds an inputted 4-bit digital data signal 1001 (9 in decimal system) to an inputted 4-bit digital data signal 1110 (14 in decimal system) to obtain 10111 (23 in decimal system). The hold means 62N receives a 4-bit digital data signal 1011 (11 in decimal system), which is obtained by discarding the least significant bit of the addition result, at rise of the clock signal CLK5. The hold means 62N then outputs the digital data signal 1011 to the thirteenth output terminal group 3N.

The fifteenth computing means 6P is connected as explained below. The first input node group (a1~a4) of the adding means 61P is connected to the output node group (c1~c4) of the hold means 61O of the fourteenth computing means 6O. The second input node group (b1~b4) is connected to the output node group (c1~c4) of the second hold means 5. The output node group (c1~c4) of the hold means 62P is connected to the fifteenth output terminal group 3P. The adding means 61P adds an inputted 4-bit digital data signal 1100 (12 in decimal system) to an inputted 4-bit digital data signal 1110 (14 in decimal system) to obtain 11010 (26 in decimal system). The hold means 62P receives a 4-bit digital data signal 1101 (13 in decimal system), which is obtained by discarding the least significant bit of the addition result, at rise of the clock signal CLK5. The hold means 62P then outputs the digital data signal 1101 to the fifteenth output terminal group 3P.

The data signal supply circuit 150 for supplying the PCM code modulation signal received from the four-times data interpolating circuit 140 to the sixteen-times data interpolating circuit 160 which is the main feature of the present invention is explained below using FIGS. 6~9. The data interface circuit 170 for providing a digital data signal from the sixteen-times data interpolating circuit 160 to the $\Sigma\Delta$ modulating circuit 210 is explained using FIG. 10 and FIG. 11. A clock signal generating circuit for providing clock signals for the sixteen-times data interpolating circuit 160, the data signal supply circuit 150, and the data interface circuit 170 is also explained using FIG. 12.

[Data Signal Supply Circuit 150]

Figure 6:
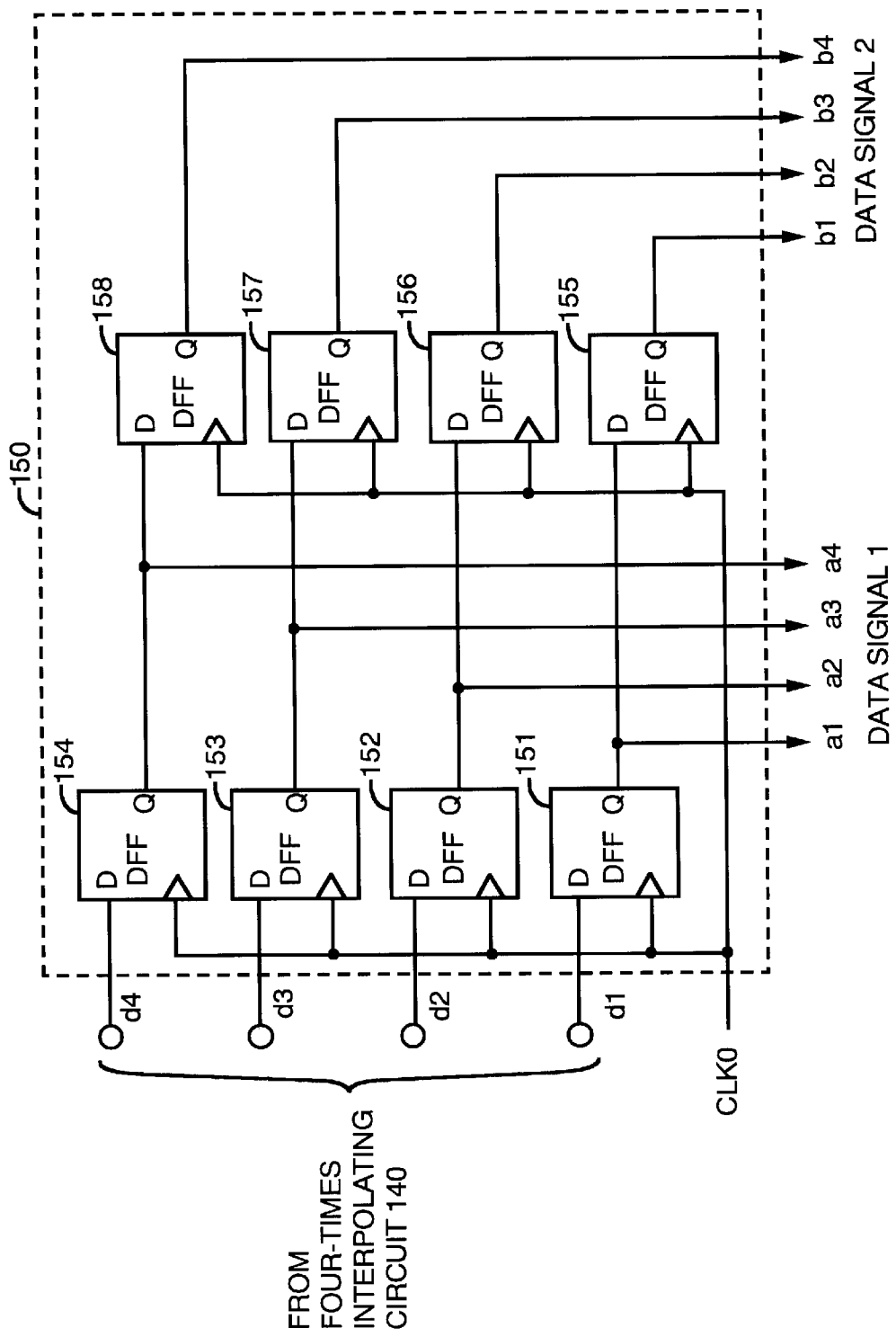
FIG. 6 shows a first data signal supply circuit for supplying output signals from a four-times data interpolating circuit to a sixteen-times data interpolating circuit.

In FIG. 6, input nodes d1~d4 are provided corresponding to respective bits of an m-bit (4-bit in the present example) PCM code modulation signal received from the four-times data interpolating circuit 140, which constitute an input node group. First output nodes a1~a4 are connected to the first input terminal group 1 of the sixteen-times data interpolating circuit 160 and constitute a first output node group. Second output nodes b1~b4 are connected to the second input terminal group 2 of the sixteen-times data interpolating circuit 160 and constitute a second output node group. A second digital data signal (a second data signal 2) immediately subsequent to a first digital data signal (a first data signal 1) is outputted from the second output node group (b1~b4).

D-type flip-flops (D-F/F) 151~154 are provided corresponding to the respective input nodes d1~d4 of the input node group. These D-type flip-flops (D-F/F) take in the PCM code modulation signal (see FIG. 7B) inputted into the input nodes d1~d4 from input terminals D in response to rise of an inputted clock signal CLK0 (with a frequency 4 fs which is four-times of the sampling frequency fs in the present example) shown in FIG. 7A. The D-type flip-flops temporarily hold the PCM code modulation signal and output the held digital data signal to output terminals Q. The D-type flip-flops 151~154 constitute a first interface portion. The respective output terminals Q are connected to the corresponding input terminals of the first input terminal group 1 of the sixteen-times data interpolating circuit 160 through the corresponding first output nodes (a1~a4).

D-type flip-flops (D-F/F) 155~158 are provided corresponding to the respective D-F/F 151~154 of the first interface portion. These D-type flip-flops (D-F/F) receives the digital data signal (see FIG. 7C) from input terminals D which is outputted from the output terminals Q of the D-F/F 151~154 in response to rise of the inputted clock signal CLK0 shown in FIG. 7A. The D-type flip-flops temporarily hold the digital data signal as shown in FIG. 7D and output it to output terminals Q. The D-type flip-flops (D-F/F) 155~158 constitute a second interface portion. The digital data signals outputted from the respective output terminals Q of the D-F/F 155~158 delay by one period of the clock signal CLK0 from the digital data signal outputted from the output terminals Q of D-F/F 151~154 of the first interface portion. Respective output terminals Q of D-F/F 155~158 are connected to the corresponding input terminals of the second input terminal group 2 of the sixteen-times data interpolating circuit 160 through the corresponding second output nodes.

Therefore, the data signal supply circuit 150 of this construction receives the PCM code modulation signal from the four-times data interpolating circuit 140 in serial in synchronism with the clock signal CLK0, and outputs two successively inputted PCM code modulation signals as individual digital data signals, that is a first data signal and a second data signal to the sixteen-times data interpolating circuit 160.

In the data signal supply circuit 150 shown in FIG. 6, the second interface portion receives the outputs of the first interface portion. The data signal supply circuit 150 outputs the two successively inputted PCM code modulation signals. The digital data signals from the second interface portion delays by one period of the clock signal CLK0 from the outputs of the first interface portion and is outputted to the sixteen-times data interpolating circuit 160. However, this is not an only way in which the data signal supply circuit 150 is concerned, but the data signal supply circuit 150 is also constructed in a way shown in FIG. 8.

Figure 8:
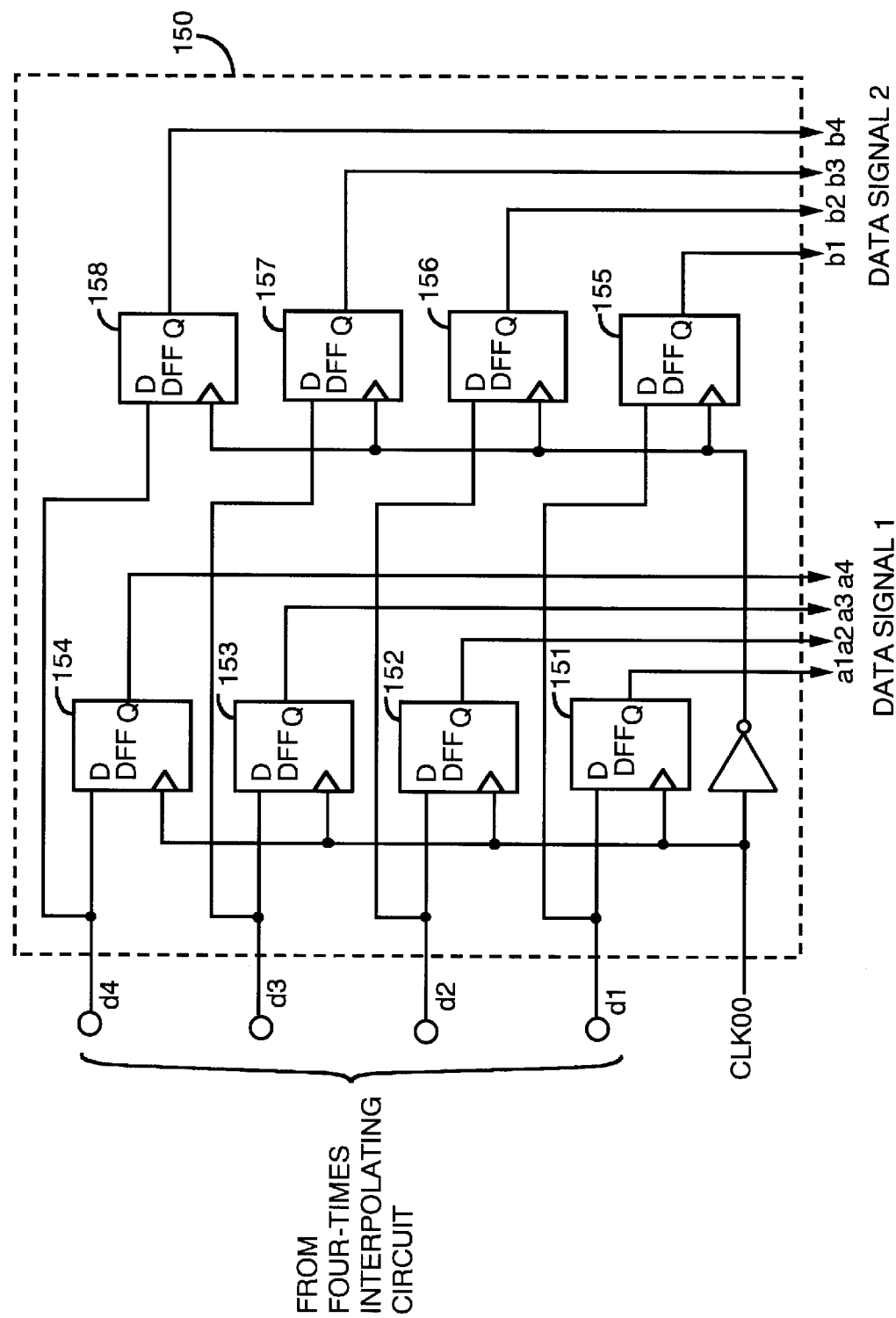
FIG. 8 shows a second data signal supply circuit for supplying output signals from a four-times data interpolating circuit to a sixteen-times data interpolating circuit.

In a data signal supply circuit shown in FIG. 8, a clock signal CLK00 (which corresponds to the CLK0) is twice the period of the clock signal CLK0 as shown in FIG. 9A. Input terminals of D-F/F 155~158 constituting a second interface portion are connected to corresponding input nodes d1~d4 of an input node group to receive the clock signal CLK00 through an inverter.

As described above, the outputs from the first interface portion are taken in in response to rise of the clock signal CLK00, and become a PCM code modulation signal of odd number of PCM code modulation signals which is successively inputted, as shown in FIG. 9C. Outputs of the second interface portion are taken in in response to fall of the clock signal CLK00, and become a PCM code modulation signal of even number of PCM code modulation signals which are successively inputted, as shown in FIG. 9D. Each data interpolating period of the sixteen-times data interpolating circuit 160 is a half cycle of the clock signal CLK00 which is substantially the same as the period shown in FIG. 7.

[Data Interface Circuit]

Figure 10:
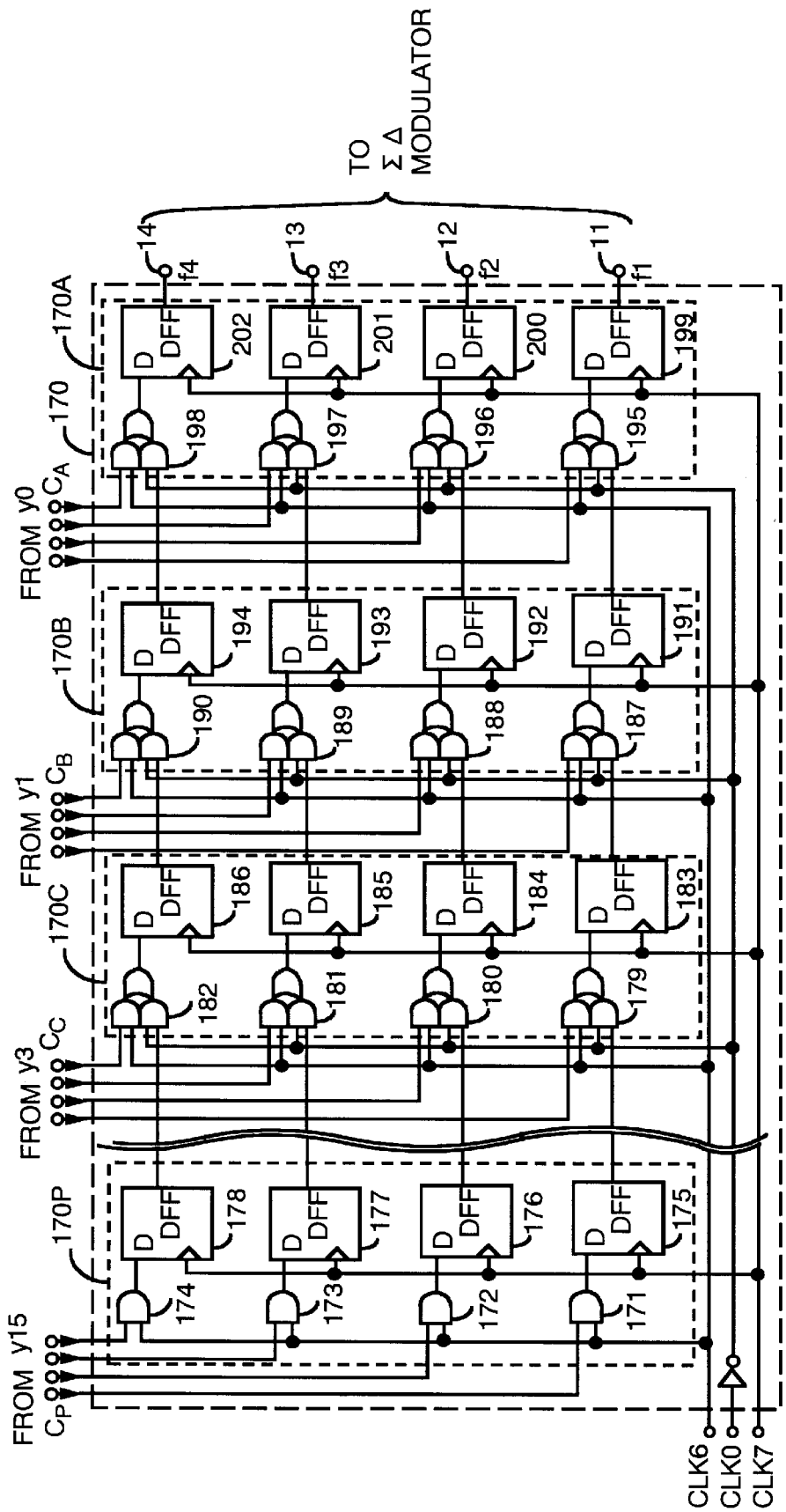
FIG. 10 shows a detailed data interface circuit of FIG. 1.
Figure 11:
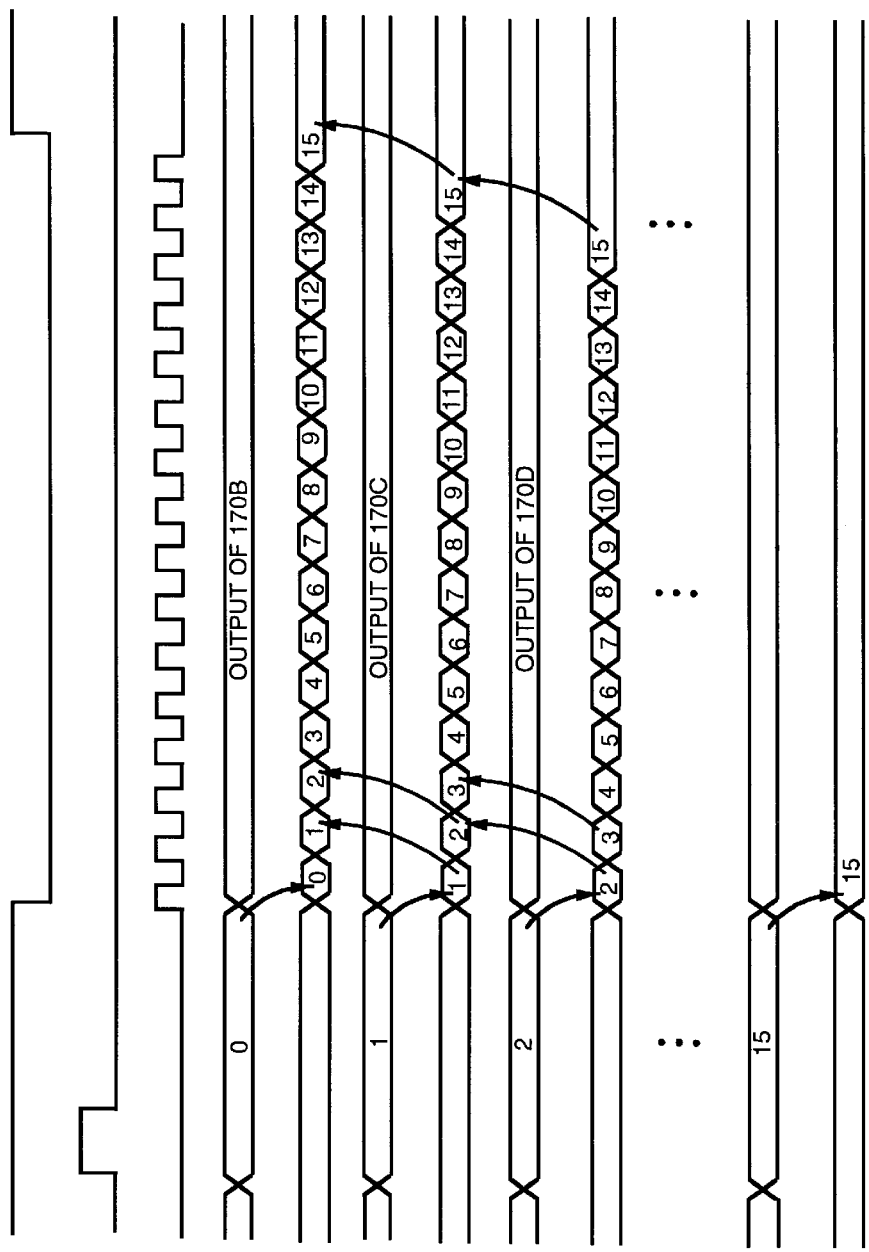
FIGS. 11A–11K show a timing chart for signals at respective portions of the data interface circuit of FIG. 10.

In FIG. 10, 0~($2^k$–1) input node groups CA~CP are provided corresponding to respective $2^k$ output terminal groups 3A~3P of a $2^k$-times data interpolating circuit 160 (k=4, $2^k$=16 in this example). The respective input node groups have m input nodes corresponding to an m-bit digital data signal (m=4 in this example). Respective input nodes are connected to corresponding output terminals of the corresponding output terminal groups 3A~3P of the $2^k$-times data interpolating circuit 160. The digital data signals f1~f4 are 64 times of m-bit digital data signal of the audio signal inputted into an audio signal processing circuit 110 in the present example. Output nodes 11~14 constitute an output node group and are connected to corresponding input nodes of the $\Sigma\Delta$ modulating circuit 210, and successively output the digital data signals f1~f4 in synchronism with a clock signal CLK7.

Interface portions 170A~170P are provided corresponding to the respective input node groups CA~CP. In the present example, the interface portions 170A~170P function as hold means by taking in the digital data signals inputted into the corresponding input node groups CA~CP and temporarily holding the digital data signals, during a first half period of the clock signal CLK0 having four-times frequency of the sampling frequency fs. In a second half period of the clock signal CLK0, respective interface portions are connected in concatenation and function as shift resistors where the ($2^k$–1)-th interface portion operates as a first stage and the 0-th interface portion operates as a last stage. In the present example, in the first half of a period of the clock signal CLK0, the interface portions 170A~170P take in the digital data signals inputted into the corresponding input node groups CA~CP in synchronism with a clock signal CLK6 which has a four-times frequency of the sampling frequency and delays by 1/16 cycles of the clock signal CLK5 in this example. In the present example, in the second half of the clock signal CLK0, the interface portions 170A~170P take in the output of the preceding interface portion in synchronism with the clock signal CLK7 which has a 128 times frequency of the sampling frequency fs and temporarily hold the taken in contents to output. In other words, in the second half of the clock signal CLK0, the interface portions 170A~170P successively output $2^k$ digital data signals, inputted into the input node groups CA~CP, from the output terminal groups 11~14 in synchronism with the clock signal CLK7.

The respective interface portions 170A~170P comprise input stage and a group of hold means. The input stage selects digital data signals received from the corresponding input node groups CA~CP or the outputs received from the preceding interface portion using the clock signals CLK0 and CLK6, and outputs the selected signals. The group of hold means receives the signals outputted from the input stages in synchronism with the clock signal CLK7 and temporarily holds and outputs the taken-in data. The interface portion 170P which operates as a first input stage only functions to take in the digital data signal inputted into the corresponding input node group CP when the interface portions function as shift resistors. The input stages of the interface portions 170O~170A at the second and remaining stages function to select any one of the digital data signals inputted into the corresponding input node groups CO (not shown)~CA or the digital data signals outputted from the group of hold means of the preceding interface portion. The outputs of the group of hold means of the last interface portion 170A are outputted to the output nodes 11~14.

The input stage of the interface portion 170P, which functions as a first stage when the interface portions function as shift resistors, has m input portions corresponding to the input nodes of corresponding input node group CP. The respective input portions receive digital data signals inputted into the corresponding input node of the input node group CP and the clock signal CLK6, and take in the digital data signal inputted at rise of the clock signal CLK6 as shown in FIG. 11J, then, keep outputting the digital data signals until the next rise of the clock signal CLK6.

The input stages of the interface portions 170O~170A, which function as the second stage and after thereof when the interface portions function as shift resistors, have m input portions 179~182, 187~190, 195~198 corresponding to the input nodes of the corresponding input node groups $C_C$~$C_A$. The respective input portions 179~182, 187~190, 195~198 receive the digital data signals inputted into the corresponding input nodes of the input node groups $C_C$~$C_A$, the corresponding bit of digital data signals outputted from the hold means of the interface portion on the preceding stage, the clock signal CLK0, and the clock signal CLK6. As shown in FIGS. 11D, F, H . . . , for example, the respective input portions 179~182, 187~190, 195~198 take in the digital data signals inputted into the corresponding input nodes of the input node groups $C_C$~$C_A$ at rise of the clock signal CLK6 while the clock signal CLK0 is at "H" level, and output the taken-in digital data signals during a period when the clock signal CLK0 is at "H" level. When the clock signal CLK0 turns into at "L" level, the respective input portions 179~182, 187~190, 195~198 take in the digital data signals of the corresponding bits outputted from the hold means of the interface portion on the preceding stage and output the taken-in digital data signals in turn.

The groups of hold means of the respective interface portions 170A~170P have the respective m hold means 175~178, 183~186, 191~194, corresponding to the input portions 171~174, 179~182, 187~190, 195~198. The respective hold means 175~178, 183~186, 191~194, 199~202 comprise D-type flip-flops (D-F/F) for receiving the digital data signals from the corresponding input portions 171~174, 179~182, 187~190, 195~198 and the clock signal CLK7, and take in the digital data signals from the corresponding input portions 171~174, 179~182, 187~190, 195~198 in synchronism with rise of the clock signal CLK7, and output the digital data signals as shown in FIGS. 11E, 11G, 11I, 11K for example.

[Clock Signal Generating Circuit]

Figure 12:
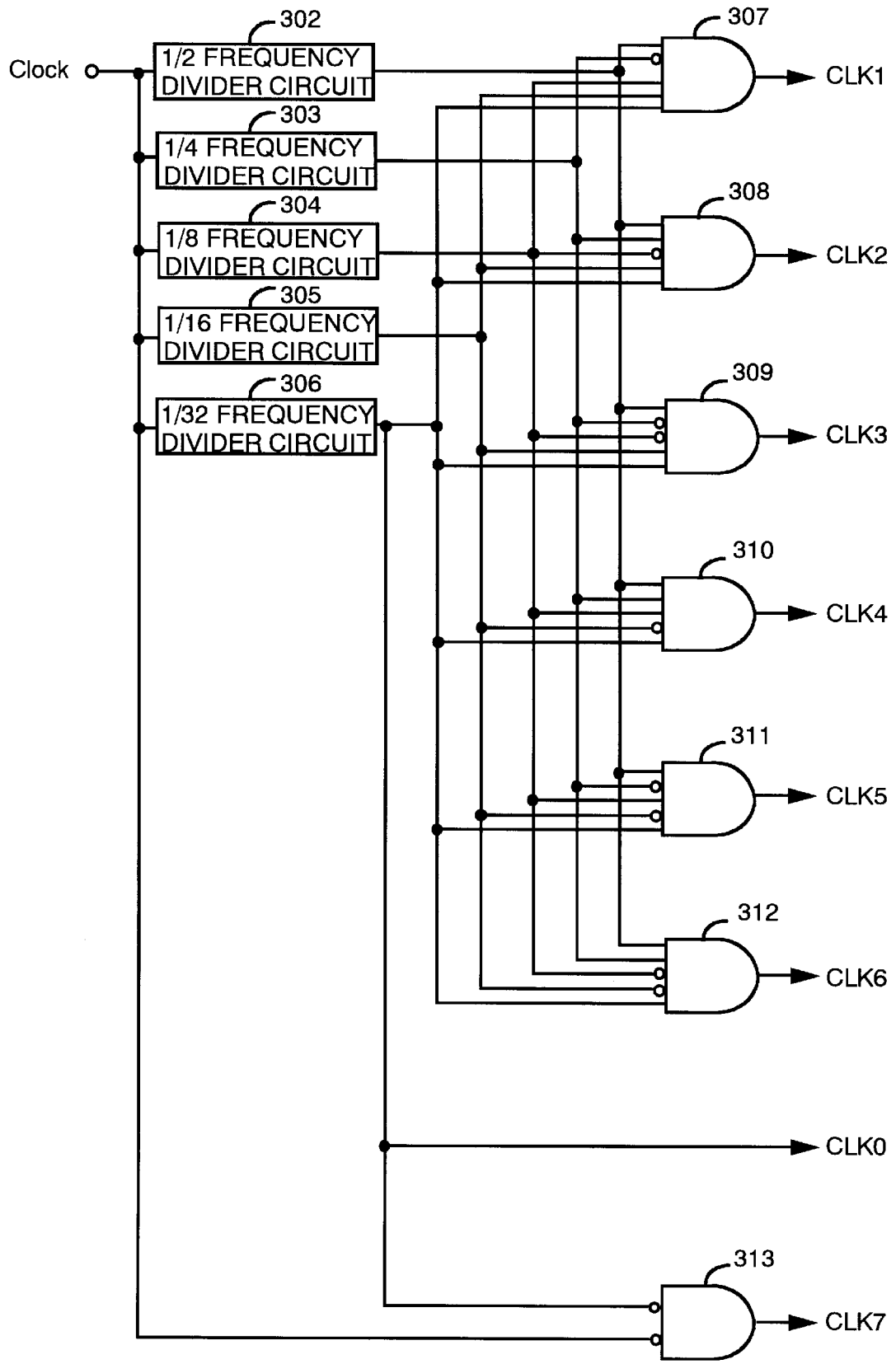
FIG. 12 shows a clock generating circuit for generating various clocks.

FIG. 12 shows a clock signal generating circuit for generating clock signals to provide for the sixteen-times data interpolating circuit 160, the data signal supply circuit 150, and the data interface circuit 170. In FIG. 12, a ½ frequency divider circuit 302, a ¼ frequency divider circuit 303, a ⅛ frequency divider circuit 304, a 1/16 frequency divider circuit 305, and a 1/32 frequency divider circuit 306 divide a reference clock signal CLK by 2, 4, 8, 16 and 32, respectively. Where, the reference clock signal CLK has a frequency 128 fs which is 128 times of the sampling frequency fs as shown in FIG. 5A. An output of the 1/32 frequency divider circuit is provided to the data signal supply circuit 150 as well as the data interface circuit 170 as the clock signal CLK0 as shown in FIG. 5I.

A first clock generating portion 307 receives the outputs of these frequency divider circuits 302, 303, 304, 305 and 306. In this example, the first clock generating portion 307 comprises a computing circuit for outputting the clock signal CLK1 shown in FIG. 5C. The clock signal CLK1 has a frequency 4 fs which is four-times of the sampling frequency fs and a pulse width which is a half period of the output of the ½ frequency divider circuit 302. The clock signal CLK1 is provided to the sixteen-times data interpolating circuit 160.

A second clock generating portion 308 receives the outputs of the frequency divider circuits 302, 303, 304, 305 and 306. In this example, the second clock generating portion 308 comprises a computing circuit for outputting the clock signal CLK2 shown in FIG. 5D. The clock signal CLK2 has a frequency 4 fs which is four-times of the sampling frequency fs and a pulse width which is a half period of the output of the ½ frequency divider circuit 302 and is delayed by 1/16 cycles from the clock signal CLK1 for example. The clock signal CLK2 is provided to the sixteen-times data interpolating circuit 160.

A third clock generating portion 309 receives the outputs of the frequency divider circuits 302, 303, 304, 305 and 306. In this example, the third clock generating portion 309 comprises a computing circuit for outputting the clock signal CLK3 shown in FIG. 5E. The clock signal CLK3 has a frequency 4 fs which is four-times of the sampling frequency fs and a pulse width which is a half period of the output of the ½ frequency divider circuit 302 and is delayed by 1/16 cycles from the clock signal CLK2 for example. The clock signal CLK3 is provided to the sixteen-times data interpolating circuit 160.

A fourth clock generating portion 310 receives the outputs of the frequency divider circuits 302, 303, 304, 305 and 306. In this example, the fourth clock generating portion 310 comprises a computing circuit for outputting the clock signal CLK4 shown in FIG. 5F. The clock signal CLK4 has a frequency 4 fs which is four-times of the sampling frequency fs and a pulse width which is a half period of the output of the ½ frequency divider circuit 302 and is delayed by 1/16 cycles from the clock signal CLK3 for example. The clock signal CLK4 is provided to the sixteen-times data interpolating circuit 160.

A fifth clock generating portion 311 receives the outputs of the frequency divider circuits 302, 303, 304, 305 and 306.

In this example, the fifth clock generating portion 311 comprises a computing circuit for outputting the clock signal CLK5 shown in FIG. 5G. The clock signal CLK5 has a frequency 4 fs which is four-times of the sampling frequency fs and a pulse width which is a half period of the output of the ½ frequency divider circuit 302 and is delayed by 1/16 cycles from the clock signal CLK4 for example. The clock signal CLK5 is provided to the sixteen-times data interpolating circuit 160.

A sixth clock generating portion 312 receives the outputs of the frequency divider circuits 302, 303, 304, 305 and 306. In this example, the sixth clock generating portion 312 comprises a computing circuit for outputting the clock signal CLK6 shown in FIG. 5H. The clock signal CLK6 has a frequency 4 fs which is four-times of the sampling frequency fs and a pulse width which is a half period of the output of the ½ frequency divider circuit 302 and is delayed by 1/16 cycles from the clock signal CLK5 for example. The clock signal CLK6 is provided to the data interface circuit 170.

A seventh clock generating portion 313 receives the reference clock signal CLK, and the CLK0 from the 1/32 frequency divider circuit. The seventh clock generating portion 313 comprises a computing circuit for outputting the clock signal CLK7 shown in FIG. 5J based on the reference clock signal CLK in a second half of a period of the CLK0, when the CLK0 is at "L" level. The clock signal CLK7 is provided to the data interface circuit 170.

An operation of the digital/analog converting portion 123 of this construction, mainly focusing on an operation of the sixteen-times data interpolating circuit 160, is explained below. Here, for simplification of explanation, it is assumed that a digital data signal is 4-bit, n is 4, and the number of digital data interpolated by the sixteen-times data interpolating circuit 160 is 15.

Figure 16:
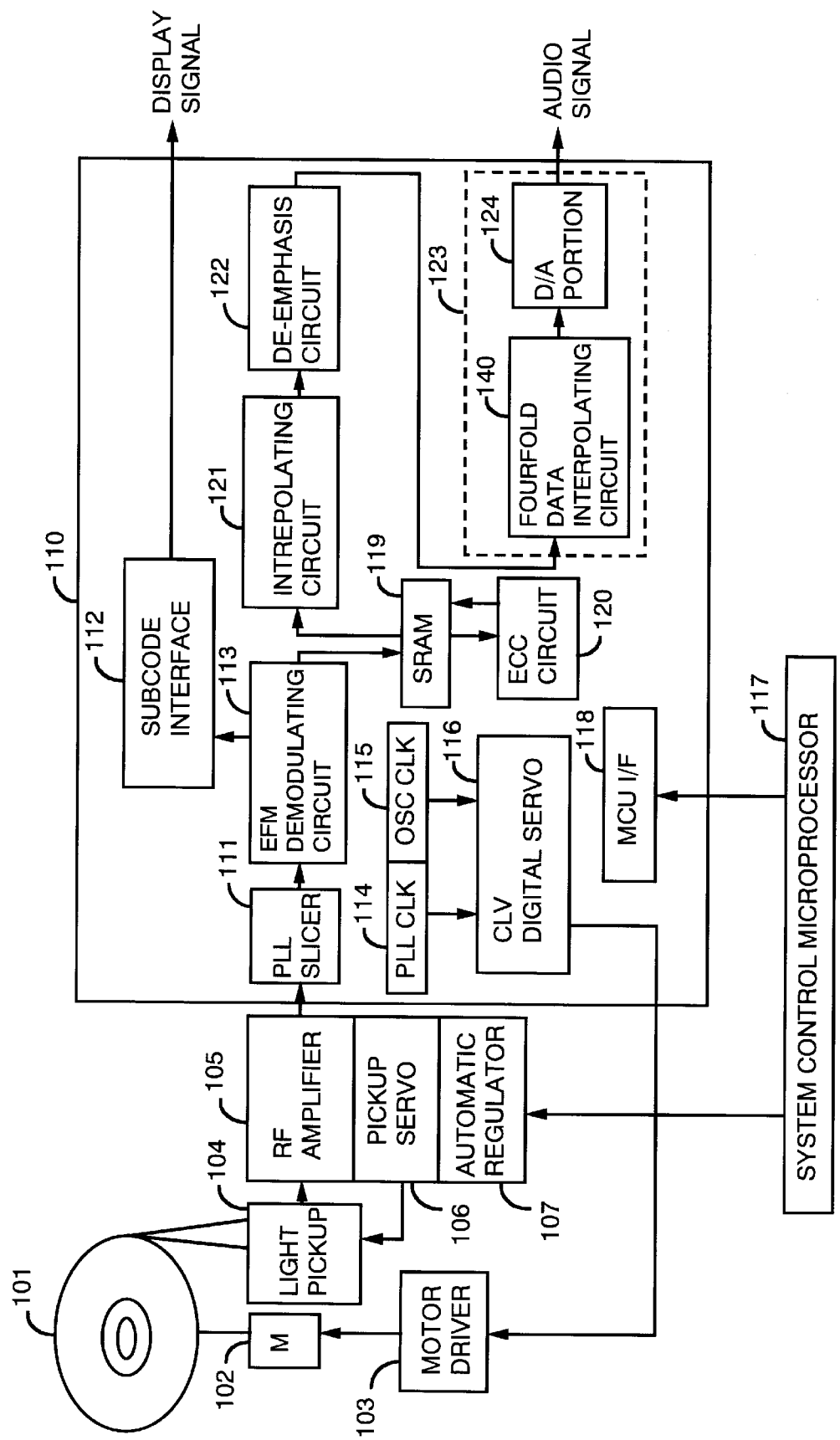
FIG. 16 is a general block diagram of a conventional CD signal reproducing apparatus for reproducing voice data and picture data recorded on a CD.

First, as shown in FIG. 16, a digital audio signal stored in a CD (digital voice storing medium) 101 is read out by a light pickup 104, and processed by an RF amplifier 105, a PLL slicer 111, an EFM demodulating circuit 113, a memory means 119, an ECC (Error Correcting Circuit) circuit 120, an interpolating circuit 121 and a de-emphasis circuit 122 according to a predetermined procedure which is already explained in the prior art. The digital audio signal is inputted into the digital/analog converting portion 123 as a pulse code modulating signal taken in at the sampling frequency fs.

As shown in FIG. 1, the pulse code modulating signal inputted into the signal input terminal 130 of the digital/analog converting portion 123 is converted into a four-times digital data signal by the four-times data interpolating circuit 140 and outputted to the data signal supply circuit 150 by the frequency 4 fs which is four-times of the sampling frequency fs.

In the data signal supply circuit 150 (see FIG. 6), the digital data signals, having the frequency 4 fs which is four-times the sampling frequency fs, inputted into the input node group d1~d4 are continuously taken in in synchronism with rise of the clock signal CLK0 shown in FIG. 7A. The data signal supply circuit 150 individually outputs the two successively input digital data signals via the first and the second output node groups (a1~a4 and b1~b4) to the sixteen-times data interpolating circuit 160 as the digital data signals as shown in FIG. 7C and FIG. 7D at each period of the clock signal CLK0 (see FIG. 7E).

As explained above, the sixteen-times data interpolating circuit which receives the two digital data signals outputted from the data signal supply circuit 150 (for simplification of explanation, the digital data signal firstly outputted from the data signal supply circuit 150 is referred to as a first digital data signal and the secondly outputted one is referred to as a second digital data signal hereinafter) interpolates fifteen digital data signals between the first digital data signal and the second one to output them as the sixteen-times digital data signals.

This operation is further explained in detail below based on FIG. 2 in case when the first 4-bit digital data signal is 0001 (1 in decimal system) and the second 4-bit digital data signal is 1110 (14 in decimal system).

The first digital data signal inputted into the first input terminal group 1 is taken in by the first hold means 4 (see FIG. 3) in synchronism with rise of the clock signal CLK1 (see FIG. SC). The first digital data signal is outputted as the 0-th digital data signal y0 from the 0-th output terminal group 3A after its value is stored in the first hold means 4. On the other hand, the second digital data signal inputted into the second input terminal group 2 is taken in by the second hold means (see FIG. 3) in synchronism with the clock signal CLK1, and outputted as the sixteenth digital data signal y16 after its value is stored in the second hold means 5.

Figure 13:
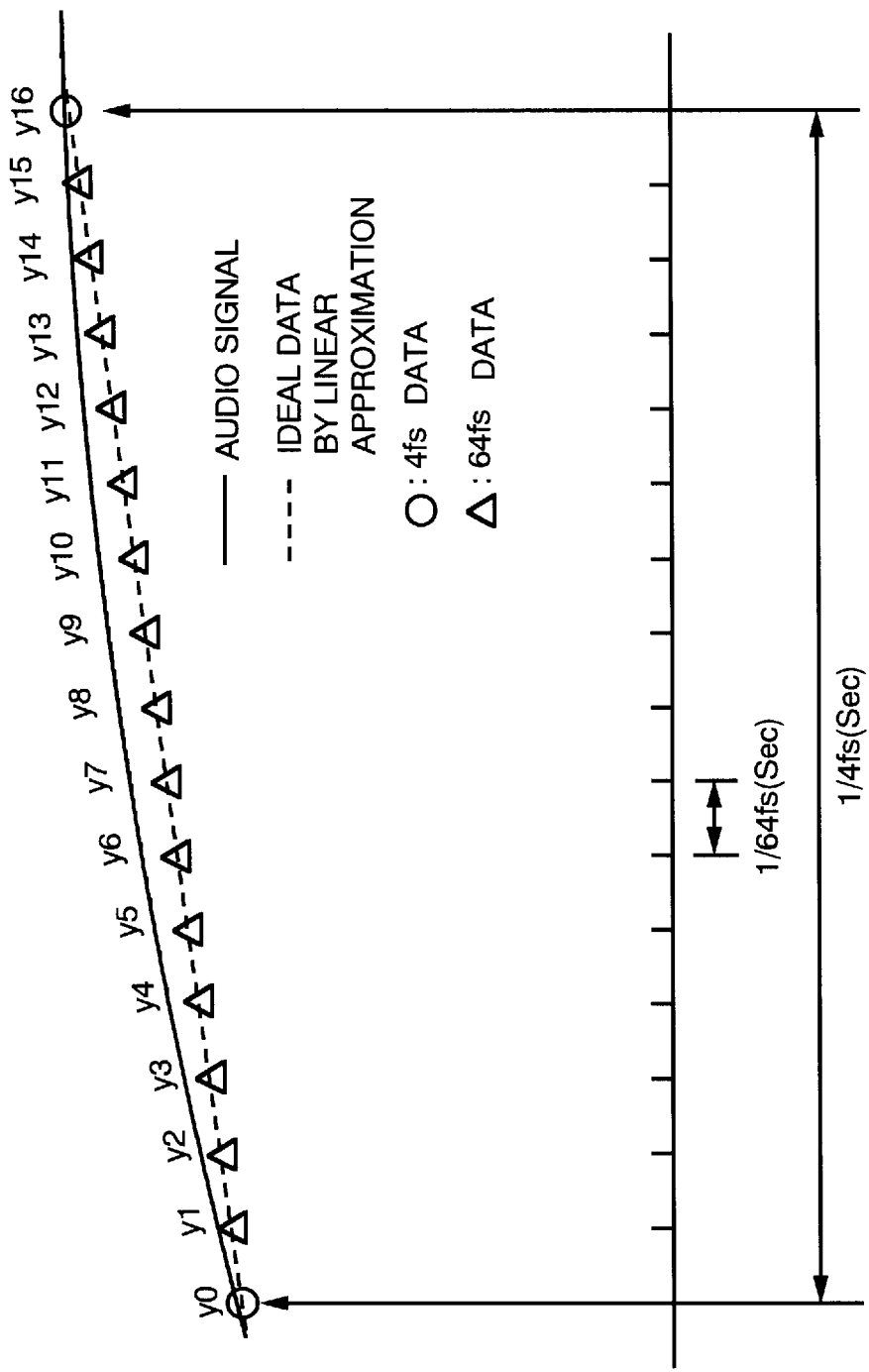
FIG. 13 shows a relationship between data interpolated by a sixteen-times interpolating circuit of the present invention, ideal data obtained by linear approximation, and actual audio signal data.

Then, based on the 0-th digital data signal y0 held and outputted by the first hold means 4 and the sixteenth digital data signal y16 held and outputted by the second hold means 5, the interpolated data generating means 6 generates fifteen digital data signals from the first to fifteenth digital data signals (y1~y15) according to a linear approximation shown in FIG. 13.

That is, the adding means 61I in the eighth computing means 6I (see FIG. 4) adds the 0-th 4-bit digital data signal 0001 (1 in decimal system) from the first hold means 4 to the sixteenth 4-bit digital data signal 1110 (14 in decimal system) from the second hold means 5 to obtain a 5-bit data signal 01111. Then, the hold means 62I takes in the four higher significant bits of this 5-bit data signal as a 4-bit digital data signal 0111 (7 in decimal system) which is nearly half of the sum of the 0-th digital data signal 0001 and the sixteenth digital data signal 1110, that is, a mid point of these two digital data signals, in synchronism with rise of the clock signal CLK2 (see FIG. 5D). The hold means 62I holds the value of the digital data signal 0111 and outputs the digital data signal from the eighth output terminal group 3I as an eighth digital data signal y8.

The adding means 61E in the fourth computing means 6E (see FIG. 4) adds the 0-th 4-bit digital data signal 0001 (1 in decimal system) from the first hold means 4 to the eighth 4-bit digital data signal 0111 (7 in decimal system) from the eighth computing means 6I to obtain a 5-bit data signal 01000. Then, the hold means 62E receives the four higher significant bits of this 5-bit data signal as a 4-bit digital data signal 0100 (4 in decimal system) which is a half of the sum of the 0-th digital data signal and the eighth digital data signal, that is, a mid point of these two digital data signals, in synchronism with rise of the clock signal CLK3 (see FIG. SE). The hold means 62E holds the value of the digital data signal 0100 and outputs the digital data signal from the fourth output terminal group 3E as a fourth digital data signal y4.

The adding means 61M in the twelfth computing means 6M (see FIG. 4) adds the eighth 4-bit digital data signal y8 of 0111 (7 in decimal system) from the eighth computing means 6I to the sixteenth 4-bit digital data signal 1110 (14 in decimal system) from the second hold means 5 to obtain a 5-bit data signal 10101. Then, the hold means 62M receives the four higher significant bits of this 5-bit data signal as a 4-bit digital data signal 1010 (10 in decimal system) which is nearly half of the sum of the eighth digital data signal and the sixteenth digital data signal, that is, a mid point of these two digital data signals, in synchronism with rise of the clock signal CLK3 (see FIG. 5E). The hold means 62M holds the value of the digital data signal 1010 and outputs the digital data signal from the twelfth output terminal group 3M as a twelfth digital data signal y12.

The adding means 61C in the second computing means 6C (see FIG. 4) adds the 0-th 4-bit digital data signal y0 of 0001 (1 in decimal system) from the first hold means 4 to the fourth 4-bit digital data signal y4 of 0100 (4 in decimal system) from the fourth computing means 6E to obtain a 5-bit data signal 00101. Then, the hold means 62C receives the four higher significant bits of this 5-bit data signal as a 4-bit digital data signal 0010 (2 in decimal system) which is nearly half of the sum of the 0-th digital data signal and the fourth digital data signal, that is, a mid point of these two digital data signals, in synchronism with rise of the clock signal CLK4 (see FIG. 5f). The hold means 62C holds the value of the digital data signal 0010 and outputs the digital data signal from the second output terminal group 3C as a second digital data signal y2.

The adding means 61G in the sixth computing means 6G (see FIG. 4) adds the 0-h 4-bit digital data signal y0 of 0001 (1 in decimal system) from the first hold means 4 to the twelfth 4-bit digital data signal y12 of 1010 (10 in decimal system) from the twelfth computing means 6M to obtain a 5-bit data signal 01011. Then, the hold means 62G receives the four higher significant bits of this 5-bit data signal as a 4-bit digital data signal 0101 (5 in decimal system) which is nearly half of the sum of the 0-th digital data signal and the twelfth digital data signal, that is, a mid point of these two digital data signals, in synchronism with rise of the clock signal CLK4. The hold means 62G holds the value of the digital data signal 0101 and outputs the digital data signal from the sixth output terminal group 3G as a sixth digital data signal y6.

The adding means 61K in the tenth computing means 6K (see FIG. 4) adds the fourth 4-bit digital data signal y4 of 0100 (4 in decimal system) from the fourth computing means 6E to the sixteenth 4-bit digital data signal y16 of 1110 (14 in decimal system) from the second hold means 5 to obtain a 5-bit data signal 10010. Then, the hold means 62K receives the four higher significant bits of this 5-bit data signal as a 4-bit digital data signal 1001 (9 in decimal system) which is a half of the sum of the fourth digital data signal and the sixteenth digital data signal, that is, a mid point of these two digital data signals, in synchronism with rise of the clock signal CLK4. The hold means 62K holds the value of the digital data signal 1001 and outputs the digital data signal from the tenth output terminal group 3K as a tenth digital data signal y10.

The adding means 61O in the fourteenth computing means 6O (see FIG. 4) adds the twelfth 4-bit digital data signal y12 of 1010 (10 in decimal system) from the twelfth computing means 6M to the sixteenth 4-bit digital data signal y16 of 1110 (14 in decimal system) from the second hold means 5 to obtain a 5-bit data signal 11000. Then, the hold means 62O receives the four higher significant bits of this 5-bit data signal as a 4-bit digital data signal 1100 (12 in decimal system) which is a half of the sum of the twelfth digital data signal and the sixteenth digital data signal, that is, a mid point of these two digital data signals, in synchronism with rise of the clock signal CLK4. The hold means 62O holds the value of the digital data signal 1100 and outputs the digital data signal from the fourteenth output terminal group 3O as a fourteenth digital data signal y14.

The adding means 61B in the first computing means 6B (see FIG. 4) adds the 0-th 4-bit digital data signal y0 of 0001 (1 in decimal system) from the first hold means 4 to the second 4-bit digital data signal y2 of 0010 (2 in decimal system) from the second computing means 6C to obtain a 5-bit data signal 00011. Then, the hold means 62B receives the four higher significant bits of this 5-bit data signal as a 4-bit digital data signal 0001 (1 in decimal system) which is nearly half of the sum of the 0-th digital data signal and the second digital data signal, that is, a mid point of these two digital data signals, in synchronism with rise of the clock signal CLK5 (see FIG. 5G). The hold means 62B holds the value of the digital data signal 0001 and outputs the digital data signal from the first output terminal group 3B as a first digital data signal y1.

The adding means 61D in the third computing means 6D (see FIG. 4) adds the 0-th 4-bit digital data signal y0 of 0001 (1 in decimal system) from the first hold means 4 to the sixth 4-bit digital data signal y6 of 0101 (5 in decimal system) from the sixth computing means 6G to obtain a 5-bit data signal 00110. Then, the hold means 62D receives the four higher significant bits of this 5-bit data signal as a 4-bit digital data signal 0011 (3 in decimal system) which is a half of the sum of the 0-th digital data signal and the sixth digital data signal, that is, a mid point of these two digital data signals, in synchronism with rise of the clock signal CLK5. The hold means 62D holds the value of the digital data signal 0011 and outputs the digital data signal from the third output terminal group 3D as a third digital data signal y3.

The adding means 61F in the fifth computing means 6F (see FIG. 4) adds the 0-th 4-bit digital data signal y0 of 0001 (1 in decimal system) from the first hold means 4 to the tenth 4-bit digital data signal y10 of 1001 (9 in decimal system) from the tenth computing means 6K to obtain a 5-bit data signal 01010. Then, the hold means 62F receives the four higher significant bits of this 5-bit data signal as a 4-bit digital data signal 0101 (5 in decimal system) which is a half of the sum of the 0-th digital data signal and the tenth digital data signal, that is, a mid point of these two digital data signals, in synchronism with rise of the clock signal CLK5. The hold means 62F holds the value of the digital data signal 0101 and outputs the digital data signal from the fifth output terminal group 3F as a fifth digital data signal y5.

The adding means 61H in the seventh computing means 6H (see FIG. 4) adds the 0-th 4-bit digital data signal y0 of 0001 (1 in decimal system) from the first hold means 4 to the fourteenth 4-bit digital data signal y14 of 1100 (12 in decimal system) from the fourteenth computing means 6O to obtain a 5-bit data signal 01101. Then, the hold means 62H receives the four higher significant bits of this 5-bit data signal as a 4-bit digital data signal 0110 (6 in decimal system) which is nearly half of the sum of the 0-th digital data signal and the fourteenth digital data signal, that is, a mid point of these two digital data signals, in synchronism with rise of the clock signal CLK5. The hold means 62H holds the value of the digital data signal 0110 and outputs the digital data signal from the seventh output terminal group 3H as a seventh digital data signal y7.

The adding means 61J in the ninth computing means 6J (see FIG. 4) adds the second 4-bit digital data signal y2 of 0010 (2 in decimal system) from the second computing means 6C to the sixteenth 4-bit digital data signal y16 of 1110 (14 in decimal system) from the second hold means 5 to obtain a 5-bit data signal 10000. Then, the hold means 62J receives the four higher significant bits of this 5-bit data signal as a 4-bit digital data signal 1000 (8 in decimal system) which is a half of the sum of the second digital data signal and the sixteenth digital data signal, that is, a mid point of these two digital data signals, in synchronism with rise of the clock signal CLK5. The hold means 62J holds the value of the digital data signal 1000 and outputs the digital data signal from the ninth output terminal group 3J as a ninth digital data signal y9.

The adding means 61L in the eleventh computing means 6L (see FIG. 4) adds the sixth 4-bit digital data signal y6 of 0101 (5 in decimal system) from the sixth computing means 6H to the sixteenth 4-bit digital data signal y16 of 1110 (14 in decimal system) from the second hold means 5 to obtain a 5-bit data signal 10011. Then, the hold means 62L receives the four higher significant bits of this 5-bit data signal as a 4-bit digital data signal 1001 (9 in decimal system) which is nearly half of the sum of the sixth digital data signal and the sixteenth digital data signal, that is, a mid point of these two digital data signals, in synchronism with rise of the clock signal CLK5. The hold means 62L holds the value of the digital data signal 1001 and outputs the digital data signal from the eleventh output terminal group 3L as a eleventh digital data signal y11.

The adding means 61N in the thirteenth computing means 6N (see FIG. 4) adds the tenth 4-bit digital data signal y10 of 1001 (9 in decimal system) from the tenth computing means 6K to the sixteenth 4-bit digital data signal y16 of 1110 (14 in decimal system) from the second hold means 5 to obtain a 5-bit data signal 10111. Then, the hold means 62N receives the four higher significant bits of this 5-bit data signal as a 4-bit digital data signal 1011 (11 in decimal system) which is nearly half of the sum of the tenth digital data signal and the sixteenth digital data signal, that is, a mid point of these two digital data signals, in synchronism with rise of the clock signal CLK5. The hold means 62N holds the value of the digital data signal 1011 and outputs the digital data signal from the thirteenth output terminal group 3N as a thirteenth digital data signal y13.

The adding means 61P in the fifteenth computing means 6P (see FIG. 4) adds the fourteenth 4-bit digital data signal y14 of 1100 (12 in decimal system) from the fourteenth computing means 60 to the sixteenth 4-bit digital data signal y16 of 1110 (14 in decimal system) from the second hold means 5 to obtain a 5-bit data signal 11010. Then, the hold means 62P receives the four higher significant bits of this 5-bit data signal as a 4-bit digital data signal 1101 (13 in decimal system) which is a half of the sum of the fourteenth digital data signal and the sixteenth digital data signal, that is, a mid point of these two digital data signals, in synchronism with rise of the clock signal CLK5. The hold means 62P holds the value of the digital data signal 1101 and outputs the digital data signal from the fifteenth output terminal group 3P as a fifteenth digital data signal y15.

The first~fifteenth digital data signals y1~y15 obtained by the interpolated data generating means 6 are close to theoretical values which are calculated from the 0-th digital data signal y0 and the sixteenth digital data signal y16. The maximal error between the calculated values and the theoretical values are restricted within two, when converted into the decimal system.

In other words, although the respective computing means 6B~6P constituting the interpolated data generating means 6 may have the error of ½ in maximum in their computing results converted into the decimal system, the maximal four computing means have the error and the maximal error is 2 (=(½)×4) as a whole in the first embodiment, because all the first~fifteenth digital data signals y1~y15 are calculated necessarily using one of the 0-th digital data signal y0 or the sixteenth digital data signal y16.

In general, to interpolate the data into $2^k$, the interpolated data generating means 6 has a k-stage computing portion, which means that maximal k computing means have error and the maximal error is (½)×k.

The 0-th~fifteenth digital data signals y0~y15 obtained as explained above are inputted into the data interface circuit 170 (see FIG. 10).

In the data interface circuit 170 (see FIG. 10), the digital data signals y0~y15 from the sixteen-times data interpolating circuit 160 are taken in parallel in synchronism with rise of the clock signal CLK6 shown in FIG. 11B. These taken-in digital data signals y0~y15 are outputted in serial to the ΣΔ modulating circuit 210 in synchronism with rise of the clock signal CLK7 shown in FIG. 11C. These output digital data signals y0~y15 are processed by the following ΣΔ modulating circuit 210, the one-bit digital/analog converting circuit 220, and the analog low-path filter 230 in the same desired procedure as explained in the prior art, and outputted from the audio signal output 240 as analog audio signals.

These analog audio signals obtained as explained above are processed by interpolating into sixty-four-times digital data signals based on the digital audio signals (the sampling frequency fs) stored in CD101, which means that the generated audio signals can be closer to the original voice. Furthermore, it is possible to interpolate the digital signals with smaller maximal error using a simplified circuit configuration of the sixteen-times data interpolating circuit 160 and obtain the audio signals with relatively high fidelity to the original voice sound.

Embodiment 2

Figure 15:
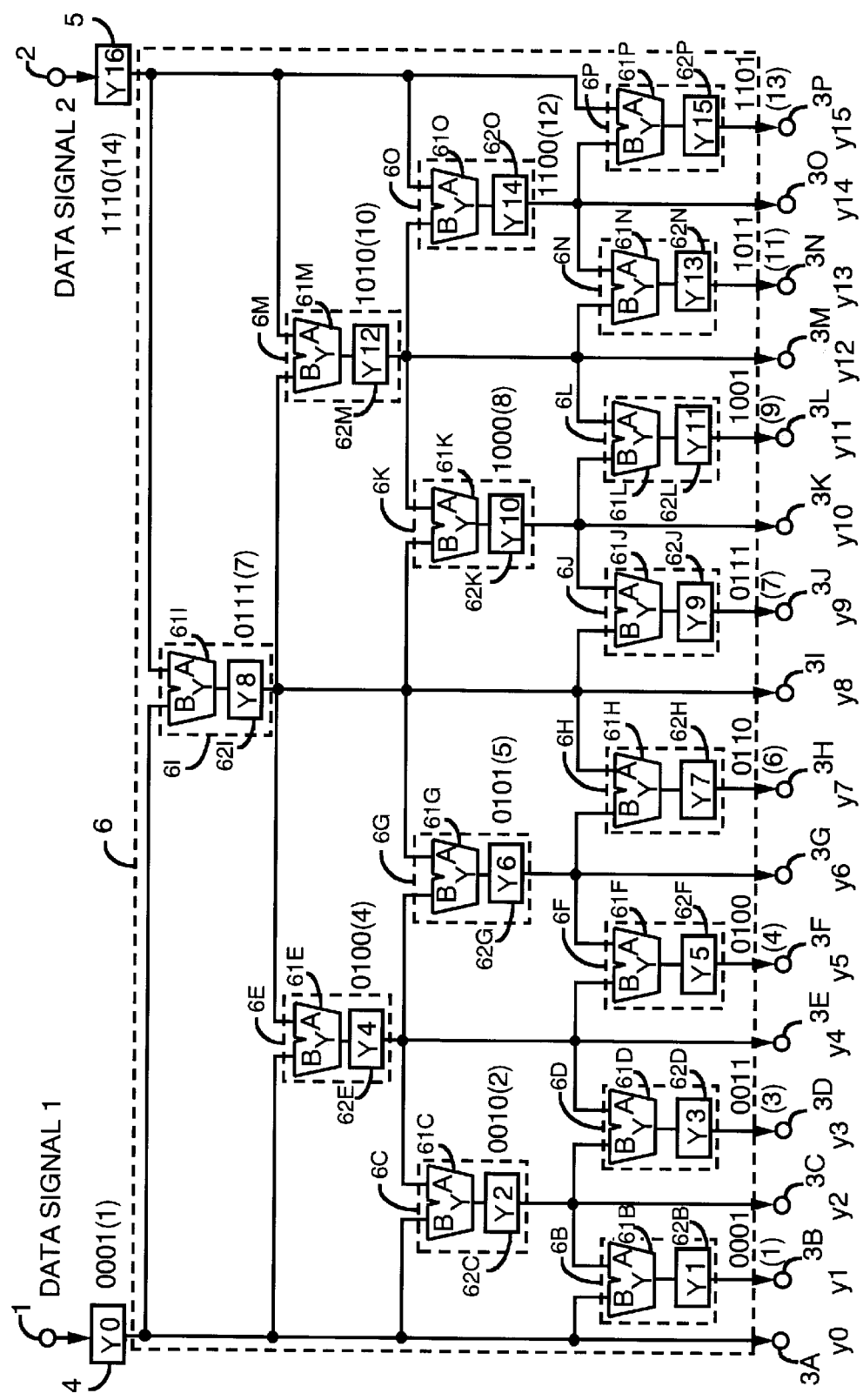
FIG. 15 is a block diagram of a sixteen-times data interpolation circuit of a second embodiment of the present invention.

A second embodiment of the present invention is explained below. FIG. 15 shows a configuration of a sixteen-times data interpolating circuit 160 according to the second embodiment of the present invention. The sixteen-times data interpolating circuit 160 shown in FIG. 15 has a first hold means 4 and a second hold means 5 which are the same as those of the first embodiment shown in FIG. 2. The sixteen-times data interpolating circuit 160 further comprises computing means 6B~6P constituting an interpolated data generating means 6 which are constituted in the similar way to those of the first embodiment, but they are connected to each other in a different way from those of the first embodiment. The sixteen-times data interpolating circuit 160 is constituted in this manner can also interpolate data signals between two data signals inputted into between a data input terminal group 1 and a data input terminal group 2. A circuit connection and an operation of the sixteen-times data interpolating circuit 160 of the second embodiment are concretely explained below.

For simplification of explanation, it is also assumed that a first 4-bit digital data signal 0001 (1 in decimal system) and a second 4-bit digital data signal 1110 (14 in decimal system), which are the same as that explained in the first embodiment. The detailed explanation is given below using FIG. 15.

The first digital data signal inputted into the first input terminal group 1 is taken in by the first hold means 4 (see FIG. 3) in synchronism with rise of a clock signal CLK1 (see FIG. 5C) and outputted from a 0-th output terminal group 3A as a 0-th digital data signal y0 after its value being held. On the other hand, the second digital data signal inputted into the second input terminal group 2 is taken in by the second hold means 5 (see FIG. 3) in synchronism with rise of the clock signal CLK1 and outputted as a sixteenth digital data signal y16 after its value being held.

Then, based on the 0-th digital data signal y0 and the sixteenth digital data signal y16 which are held and outputted by the first hold means 4 and the second hold means 5, respectively, first~fifteenth digital data signals (y1~y15) are generated by the interpolated data generating means 6 according to a linear approximation shown in FIG. 13 which is the same as that explained in the first embodiment.

In other words, an adding means 61I in the eighth computing means 6I (see FIG. 4) adds the 0-th 4-bit digital data signal of 0001 (1 in decimal system) from the first hold means 4 to the sixteenth 4-bit digital data signal 1110 (14 in decimal system) from the second hold means 5 to obtain a 5-bit data signal 01111. Then, a hold means 62I receives the four higher significant bits of this 5-bit data signal as a 4-bit digital data signal 0111 (7 in decimal system) which is nearly half of the sum of the 0-th digital data signal 0001 and the sixteenth digital data signal 1110, that is, a mid point of these two digital data signals, in synchronism with rise of a clock signal CLK2 (see FIG. 5D). The hold means 62I holds the value of the digital data signal 0111 and outputs the digital data signal from a eighth output terminal group 3I as the eighth digital data signal y8.

An adding means 61E in the fourth computing means 6E (see FIG. 4) adds the 0-th 4-bit digital data signal y0 of 0001 (1 in decimal system) from the first hold means 4 to the eighth 4-bit digital data signal 0111 (7 in decimal system) from the eighth computing means 6I to obtain a 5-bit data signal 01000. Then, a hold means 62E receives the four higher significant bits of this 5-bit data signal as a 4-bit digital data signal 0100 (4 in decimal system) which is a half of the sum of the 0-th digital data signal and the eighth digital data signal, that is, a mid point of these two digital data signals, in synchronism with rise of a clock signal CLK3 (see FIG. 5E). The hold means 62E holds the value of the digital data signal 0100 and outputs the digital data signal from a fourth output terminal group 3E as the fourth digital data signal y4.

An adding means 61M in the twelfth computing means 6M (see FIG. 4) adds the eighth 4-bit digital data signal y8 of 0111 (7 in decimal system) from the eighth computing means 6I to the sixteenth 4-bit digital data signal 1110 (14 in decimal system) from the second hold means 5 to obtain a 5-bit data signal 10101. Then, a hold means 62M receives the four higher significant bits of this 5-bit data signal as a 4-bit digital data signal 1010 (10 in decimal system) which is nearly half of the sum of the eighth digital data signal and the sixteenth digital data signal, that is, a mid point of these two digital data signals, in synchronism with rise of the clock signal CLK3 (see FIG. 5E). The hold means 62M holds the value of the digital data signal 1010 and outputs the digital data signal from a twelfth output terminal group 3M as the twelfth digital data signal y12.

An adding means 61C in the second computing means 6C (see FIG. 4) adds the 0-th 4-bit digital data signal y0 of 0001 (1 in decimal system) from the first hold means 4 to the fourth 4-bit digital data signal y4 of 0100 (4 in decimal system) from the fourth computing means 6E to obtain a 5-bit data signal 00101. Then, a hold means 62C receives the four higher significant bits of this 5-bit data signal as a 4-bit digital data signal 0010 (2 in decimal system) which is nearly half of the sum of the 0-th digital data signal and the fourth digital data signal, that is, a mid point of these two digital data signals, in synchronism with rise of a clock signal CLK4 (see FIG. 5F). The hold means 62C holds the value of the digital data signal 0010 and outputs the digital data signal from a second output terminal group 3C as the second digital data signal y2.

An adding means 61G in the sixth computing means 6G (see FIG. 4) adds the fourth 4-bit digital data signal y4 of 0100 (4 in decimal system) from the fourth computing means 6E to the eighth 4-bit digital data signal y8 of 0111 (7 in decimal system) from the eighth computing means 6I to obtain a 5-bit data signal 01011. Then, a hold means 62G receives the four higher significant bits of this 5-bit data signal as a 4-bit digital data signal 0101 (5 in decimal system) which is nearly half of the sum of the fourth digital data signal and the eighth digital data signal, that is, a mid point of these two digital data signals, in synchronism with rise of the clock signal CLK4. The hold means 62G holds the value of the digital data signal 0101 and outputs the digital data signal from a sixth output terminal group 3G as the sixth digital data signal y6.

An adding means 61K in the tenth computing means 6K (see FIG. 4) adds the eighth 4-bit digital data signal y8 of 0111 (7 in decimal system) from the eighth computing means 6I to the twelfth 4-bit digital data signal y12 of 1010 (10 in decimal system) from the twelfth computing means 6M to obtain a 5-bit data signal 10001. Then, a hold means 62K receives the four higher significant bits of this 5-bit data signal as a 4-bit digital data signal 1000 (8 in decimal system) which is nearly half of the sum of the eighth digital data signal and the twelfth digital data signal, that is, a mid point of these two digital data signals, in synchronism with rise of the clock signal CLK4. The hold means 62K holds the value of the digital data signal 1000 and outputs the digital data signal from a tenth output terminal group 3K as the tenth digital data signal y10.

An adding means 61O in the fourteenth computing means 6O (see FIG. 4) adds the twelfth 4-bit digital data signal y12 of 1010 (10 in decimal system) from the twelfth computing means 6M to the sixteenth 4-bit digital data signal y16 of 1110 (14 in decimal system) from the second hold means 5 to obtain a 5-bit data signal 11000. Then, a hold means 62O receives the four higher significant bits of this 5-bit data signal as a 4-bit digital data signal 1100 (12 in decimal system) which is a half of the sum of the twelfth digital data signal and the sixteenth digital data signal, that is, a mid point of these two digital data signals, in synchronism with rise of the clock signal CLK4. The hold means 62O holds the value of the digital data signal 1100 and outputs the digital data signal from a fourteenth output terminal group 3O as the fourteenth digital data signal y14.

An adding means 61B in the first computing means 6B (see FIG. 4) adds the 0-th 4-bit digital data signal y0 of 0001 (1 in decimal system) from the first hold means 4 to the second 4-bit digital data signal y2 of 0010 (2 in decimal system) from the second computing means 6C to obtain a 5-bit data signal 00011. Then, a hold means 62B receives the four higher significant bits of this 5-bit data signal as a 4-bit digital data signal 0001 (1 in decimal system) which is nearly half of the sum of the 0-th digital data signal and the second digital data signal, that is, a mid point of these two digital data signals, in synchronism with rise of a clock signal CLKS (see FIG. 5G). The hold means 62B holds the value of the digital data signal 0001 and outputs the digital data signal from a first output terminal group 3B as the first digital data signal y1.

An adding means 61D in the third computing means 6D (see FIG. 4) adds the second 4-bit digital data signal y2 of 0010 (2 in decimal system) from the second computing means 6C to the fourth 4-bit digital data signal y4 of 0100 (4 in decimal system) from the fourth computing means 6E to obtain a 5-bit data signal 00110. Then, a hold means 62D receives the four higher significant bits of this 5-bit data signal as a 4-bit digital data signal 0011 (3 in decimal system) which is a half of the sum of the second digital data signal and the fourth digital data signal, that is, a mid point of these two digital data signals, in synchronism with rise of the clock signal CLK5. The hold means 62D holds the value of the digital data signal 0011 and outputs the digital data signal from a third output terminal group 3D as the third digital data signal y3.

An adding means 61F in the fifth computing means 6F (see FIG. 4) adds the fourth 4-bit digital data signal y4 of 0100 (4 in decimal system) from the fourth computing means 6E to the sixth 4-bit digital data signal y6 of 0101 (5 in decimal system) from the sixth computing means 6G to obtain a 5-bit data signal 01001. Then, a hold means 62F receives the four higher significant bits of this 5-bit data signal as a 4-bit digital data signal 0100 (4 in decimal system) which is nearly half of the sum of the fourth digital data signal and the sixth digital data signal, that is, a mid point of these two digital data signals, in synchronism with rise of the clock signal CLK5. The hold means 62F holds the value of the digital data signal 0100 and outputs the digital data signal from a fifth output terminal group 3F as the fifth digital data signal y5.

An adding means 61H in the seventh computing means 6H (see FIG. 4) adds the sixth 4-bit digital data signal y6 of 0101 (5 in decimal system) from the sixth computing means 6G to the eighth 4-bit digital data signal y8 of 0111 (7 in decimal system) from the eighth computing means 6I to obtain a 5-bit data signal 01100. Then, a hold means 62H receives the four higher significant bits of this 5-bit data signal as a 4-bit digital data signal 0110 (6 in decimal system) which is a half of the sum of the sixth digital data signal and the eighth digital data signal, that is, a mid point of these two digital data signals, in synchronism with rise of the clock signal CLK5. The hold means 62H holds the value of the digital data signal 0110 and outputs the digital data signal from a seventh output terminal group 3H as the seventh digital data signal y7.

An adding means 61J in the ninth computing means 6J (see FIG. 4) adds the eighth 4-bit digital data signal y8 of 0111 (7 in decimal system) from the eighth computing means 6I to the tenth 4-bit digital data signal y10 of 1000 (8 in decimal system) from the tenth computing means 6K to obtain a 5-bit data signal 01111. Then, a hold means 62J receives the four higher significant bits of this 5-bit data signal as a 4-bit digital data signal 0111 (7 in decimal system) which is nearly half of the sum of the eighth digital data signal and the tenth digital data signal, that is, a mid point of these two digital data signals, in synchronism with rise of the clock signal CLK5. The hold means 62J holds the value of the digital data signal 0111 and outputs the digital data signal from a ninth output terminal group 3J as the ninth digital data signal y9.

An adding means 61L in the eleventh computing means 6L (see FIG. 4) adds the tenth 4-bit digital data signal y10 of 1000 (8 in decimal system) to the twelfth 4-bit digital data signal y12 of 1010 (10 in decimal system) from the twelfth computing means 6M to obtain a 5-bit data signal 10010. Then, a hold means 62L receives the four higher significant bits of this 5-bit data signal as a 4-bit digital data signal 1001 (9 in decimal system) which is a half of the sum of the tenth digital data signal and the twelfth digital data signal, that is, a mid point of these two digital data signals, in synchronism with rise of the clock signal CLK5. The hold means 62L holds the value of the digital data signal 1001 and outputs the digital data signal from an eleventh output terminal group 3L as the eleventh digital data signal y11.

An adding means 61N in the thirteenth computing means 6N (see FIG. 4) adds the twelfth digital data signal y12 of 1010 (10 in decimal system) from the twelfth computing means 6M to the fourteenth 4-bit digital data signal y14 of 1100 (12 in decimal system) from the fourteenth computing means 6O to obtain a 5-bit data signal 10110. Then, a hold means 62N receives the four higher significant bits of this 5-bit data signal as a 4-bit digital data signal 1011 (11 in decimal system) which is a half of the sum of the twelfth digital data signal and the fourteenth digital data signal, that is, a mid point of these two digital data signals, in synchronism with rise of the clock signal CLK5. The hold means 62N holds the value of the digital data signal 1011 and outputs the digital data signal from a thirteenth output terminal group 3N as the thirteenth digital data signal y13.

An adding means 61P in the fifteenth computing means 6P (see FIG. 4) adds the fourteenth 4-bit digital data signal y14 of 1100 (12 in decimal system) from the fourteenth computing means 6O to the sixteenth 4-bit digital data signal y16 of 1110 (14 in decimal system) from the second hold means 5 to obtain a 5-bit data signal 11010. Then, a hold means 62P receives the four higher significant bits of this 5-bit data signal as a 4-bit digital data signal 1101 (13 in decimal system) which is a half of the sum of the fourteenth digital data signal and the sixteenth digital data signal, that is, a mid point of these two digital data signals, in synchronism with rise of the clock signal CLK5. The hold means 62P holds the value of the digital data signal 1101 and outputs the digital data signal from a fifteenth output terminal group 3P as the fifteenth digital data signal y15.

A mid value yi in interpolation according to the data of (n−1) points of the above mentioned second embodiment of the present invention is calculated as follows in relation with two data input signals:

$y_i = \{y_0 + y_{2i}\}/2$: in case that one of the input terminals is connected to Y0;

$y_i = \{y_{(2i-n)} + y_n\}/2$: in case that one of the input terminals is connected to Yn;

$y_i = \{y_{(i-j)} + y_{(i+j)}\}/2$: in case that both of the input terminals are not connected to Y0 or Yn;

where, an interpolating number n is an integer expressed by second power of 2 (2, 4, 8, 16 . . . ), an integer i is larger than 0 and smaller than n (0<i<n), and j is smaller than i and also smaller than n−i. A 0-th inputted data signal y0 is a first data signal, an n-th output data signal $y_n$ is a second data signal, an output data signal from a 2i-th computing means y2i is a mid value held by a hold circuit of the 2i-th computing means, an output data signal $y_{(2i-1)}$ from a (2i−n)-th computing means is a mid value held by a hold circuit of the (2i−n)-th computing means, an output data signal $y_{(i-j)}$ from an (i−j)-th computing means is a mid value held by a hold circuit of the (i−j)-th computing means, and an output data signal $y_{(i+j)}$ from an (i+j)-th computing means is a mid value held by a hold circuit of the (i+j)-th computing means.

The first~fifteenth digital data signals y1~y15 obtained by the interpolated data generating means 6 is close to theoretical values obtained by calculation using the 0-th digital data signal y0 and the sixteenth digital data signal y16, when converted into the decimal system, in the same way as in the first embodiment as shown in FIG. 14.

For example, a maximal error of the output signal of the data output terminals 3I in FIG. 15 is equal to a maximal error ½ by the computing means 6I. A maximal error of the output signal of the data output terminals 3E is equal to 1 which is the sum of the maximal error ½ of the computing means 6I and a maximal error of ½ by the computing means 6E. A maximal error of the output signal of the data output terminals 3M is equal to 1 which is the sum of the maximal error ½ by the computing means 6I and a maximal error ½ of the computing means 6M. In the same way, a maximal error of the data output terminals 3C is equal to 3/2 which is the sum of the maximal error 1 by the computing means 6E and a maximal error ½ of the computing means 6C. A maximal error of the outputted signal of the data output terminals 3O is equal to 3/2 which is the sum of the maximal error 1 of the computing means 6M and a maximal error ½ of the computing means 6O.

In the same way, a maximal error of the output signal of the data output terminals 3G is equal to 2 which is the sum of the maximal error 1 of the computing means 6E, a maximal error ½ of the computing means 6G, and the maximal error ½ of the computing means 6I. In the same way, a maximal error of the output signal of the data output terminals 3K is equal to 2 which is the sum of the maximal error 1 of the computing means 6M and the maximal error ½ of the computing means 6I.

A maximal output error the data output terminals 3F is equal to 7/2 which is the sum of the maximal error 2 of the computing means 6G, the maximal output error 1 of the computing means 6E, and a maximal output error ½ of the computing means 6F. A maximal output error of the data output terminals 3F is equal to 7/2 which is the sum of a maximal output error 2 of a computing means 6K, a maximal output error 1 of a computing means 6M, and the maximal output error ½ of the computing means 6L. As mentioned above, the maximal error of the second embodiment is equal to 7/2.

What is claimed is:

1. A data interpolating circuit for generating n digital data signals from two digital data signals by interpolating (n−1) data between said two digital data signals comprising:
   a first hold circuit for holding a first data signal and a second hold circuit for holding a second data signal;
   (n−1) computing means each having a computing circuit for computing a mid value of the two inputted digital signals and a hold circuit for holding the computed mid value; wherein
   said (n−1) computing means are connected so that a mid value yi held by a hold circuit of an i-th computing means is expressed by following general equations, $Yi = (Y_0 + Y_{2i})/2$: in case $i \leq n/2$ $Yi = (Y_{(2i-n)} + Yn)/2$: in case $i > n/2$;

where an interpolating number n equals $2^Z$ and Z is a positive real number, an integer i is larger than 0 and smaller than n (0<i<n), a 0-th output data signal $Y_0$ is said first data signal, an n-th output data signal $Y_n$ is said second data signal, an output data signal $Y_{2i}$ from a 2i-th computing means is a mid value held by a hold circuit of the 2i-th computing means, an output data signal $Y_{(2i-1)}$ from a (2i−n)-th computing means is a mid value held by a hold circuit of the (2i−n)-th computing means.

2. A data interpolating circuit of claim 1 wherein:
   said computing circuit of said respective computing means has the same number of full adders as that of the input digital data signals, said full adders obtain a ½ of a sum of the two input digital data signals by adding corresponding bits of the two input digital data signals, outputting a carry signal obtained by the result of addition result to a full adder corresponding to a next higher bit, and obtaining an output digital data signal as an addition result from the output of full adders corresponding to bits except for the least significant bit, wherein a low signal is inputted into a carry input terminal of a full adder corresponding to a least significant bit.

3. A data interpolating circuit of any one of claim 2 wherein:
   said hold circuit of said respective computing means has the same number of flip-flops as the bit number of the input digital data signals, each flip-flop holds a corresponding bit of the input digital data signals in synchronism with an input clock signal, wherein the held contents are reset in response to an input reset signal.

4. A data interpolating circuit of claim 1 wherein:
   said hold circuit of said respective computing means has the same number of flip-flops as the bit number of the input digital data signals, each flip-flop holds a corresponding bit of the input digital data signals in synchronism with an input clock signal, wherein the held contents are reset in response to an input reset signal.

5. A data interpolating circuit for generating n digital data signals from two digital data signals by interpolating (n−1) data between said two digital data signals comprising:
   a first hold circuit for holding a first data signal and a second hold circuit for holding a second data signal;
   (n−1) computing means each having a computing circuit for computing a mid value of the two inputted digital signals and a hold circuit Yi for holding the computed mid value; wherein
   said (n−1) computing means are connected so that a mid value yi held by a hold circuit of an i-th computing means is expressed by following general equations, $Yi = \{Y_0 + Y_{2i}\}/2$: in case that input terminals is connected to $Y0$;

$Yi = \{Y_{(2i-n)} + Y_n\}/2$: in case that the input terminals is connected to $Yn$;

$Yi = \{Y_{(i-j)} + Y_{(i+j)}\}/2$: in case that both input terminals are not connected to $Y0$ or $Yn$;

where an interpolating number n equals $2^Z$ and Z is a positive real number, an integer i is larger than 0 and smaller than n(0<i<n), and j is smaller than i and also smaller than n−i, a 0-th inputted data signal y0 is a first data signal, a n-th outputted data signal $Y_n$ is a second data signal, an outputted data signal from a 2i-th computing means y2i is a mid value held by a hold circuit of the 2i-th computing means, an outputted data signal $Y_{(2i-1)}$ from a (2i−n)-th computing means, a mid value humid value held by a hold circuit of the (2i−n)-th computing means, an outputted data signal $Y_{(i-j)}$ from an (i−j)-th computing means is a mid value held by a hold circuit of the (i−j)-th computing means, and an outputted data signal $Y_{(i+j)}$ from an (i+j)-th computing means is a mid value held by a hold circuit of the (i+j)-th computing means.

6. A data interpolating circuit of claim 5 wherein:
   said computing circuit of said respective computing means has the same number of full adders as that of the input digital data signals, said full adders obtain a ½ of a sum of the two input digital data signals by adding corresponding bits of the two input digital data signals, outputting a carry signal obtained by the result of addition result to a full adder corresponding to a next higher bit, and obtaining an output digital data signal as an addition result from the output of full adders corresponding to bits except for the least significant bit, wherein a low signal is inputted into a carry input terminal of a full adder corresponding to a least significant bit.

7. A data interpolating circuit of any one of claim 6 wherein:

said hold circuit of said respective computing means has the same number of flip-flops as the bit number of the input digital data signals, each flip-flop holds a corresponding bit of the input digital data signals in synchronism with an input clock signal, wherein the held contents are reset in response to an input reset signal.

8. A data interpolating circuit of claim 5 wherein:

said hold circuit of said respective computing means has the same number of flip-flops as the bit number of the input digital data signals, each flip-flop holds a corresponding bit of the input digital data signals in synchronism with an input clock signal, wherein the held contents are reset in response to an input reset signal.

9. A data interpolating circuit comprising:

a first and a second input terminal groups for individually receiving two inputted m-bit digital data signals;

$2^k$ output terminal groups for outputting the m-bit digital data signals respectively, k being an integer;

a first hold means for temporarily holding the digital data signal received by said first input terminal group and outputting the digital data signal as a 0-th digital data signal from an output node group connected to said 0-th output terminal group;

a second hold means for temporarily holding the digital data signal received by said second input terminal group and outputting the digital data signal as a $2^k$-th digital data signal from an output node group connected to said $2^k$-th output terminal group; and $(2^k-1)$ computing means provided corresponding to said first through $(2^k-1)$ output terminal groups; wherein, said respective computing means has an adding means and a hold means, said adding means having a first input node group and a second input node group for receiving digital data signals respectively for adding the two digital data signals inputted into the first input node group and the second input node group and outputting the addition result, and said hold means for temporarily holding an m-bit digital data signal among the addition result received from the adding means except a least significant bit, and outputting the held digital data signal as a digital data signal from an output node group connected to corresponding output terminal group; wherein said first input node group and the second input node group of the adding means of the respective computing means having the different numbers to each other, a sum of each input node group number being twice of the output node group number of corresponding hold means.

10. A data interpolating circuit comprising:

a first and a second input terminal groups for individually receiving two inputted m-bit digital data signals;

$2^k$ output terminal groups for outputting the m-bit digital data signals respectively, k being an integer;

a first hold means for temporarily holding the digital data signal received by said first input terminal group and outputting the digital data signal as a 0-th digital data signal from an output node group connected to said 0-th output terminal group;

a second hold means for temporarily holding the digital data signal received by said second input terminal group and outputting the digital data signal as a $2^k$-th digital data signal from an output node group connected to said $2^k$-th output terminal group; and $(2^k-1)$ computing means provided corresponding to said first through $(2^k-1)$ output terminal groups; wherein, said respective computing means has an adding means and an hold means, said adding means having a first input node group and a second input node group for receiving digital data signals respectively for adding the two digital data signals inputted into the first input node group and the second input node group and outputting the addition result, and said hold means for temporarily holding an m-bit digital data signal among the addition result received from the adding means except a least significant bit, and outputting the held digital data signal as a digital data signal from an output node group connected to corresponding output terminal group; wherein said first input node group of the adding means of the respective computing means being connected to either one of the output node groups of the first hold means for outputting the 0-th digital data signal or the output node group of the second hold means for outputting the $2^k$-th digital data signal;

said second input node group being connected to an output node group of the hold means for outputting a digital data signal, whose group number is obtained by subtracting the first input node group number from twice of the output node group number of the corresponding hold means.

11. A data interpolating circuit comprising:

a first input terminal group and a second input terminal group for individually receiving two different m-bit digital data signals;

$2^k$ output terminal groups for outputting the m-bit digital data signals respectively, k being an integer;

a first hold means for temporarily holding the digital data signal received by said first input terminal group and outputting the digital data signal as a 0-th digital data signal from an output node group connected to said 0-th output terminal group;

a second hold means for temporarily holding the digital data signal received by said second input terminal group and outputting the digital data signal as a $2^k$-th digital data signal from an output node group connected to said $2^k$-th output terminal group; and k stages of computing portions; wherein, said computing portion of the first stage has a computing means comprising an adding means and a hold means, said adding means comprising a first input node group connected to the output node group of said first hold means and a second input node group connected to the output node group of said second hold means for adding two digital data signals inputted into the first input node group and the second input node group and outputting the addition result, and said hold means for temporarily holding m-bit digital data signal of the addition result received from the adding means except the least significant bit and outputting the held digital data signal from an output node group;

each computing portions of a half of the second stages and after thereof comprises an adding means and a hold means; said adding means comprising a first input node group connected to the output node group of said first hold means and a second input node group connected to the output node group of the hold means in one of the computing means in the computing portion of the preceding stage, said adding means for adding two digital data signals inputted into the first input node group and the second input node group, and said hold means for temporarily holding an m-bit digital data signal of the addition result received from the adding means except the least significant bit and for outputting the held digital data signal from the output node group; and respective computing mean in each computing portions of the rest half of the second stages and after thereof have respective adding means and hold means, said adding means having a first input node group connected to the output node group of one of the hold means in the computing means of the preceding stage and a second node group connected to the output node group of one of the hold means in the different computing means of the preceding stage, said adding means for adding two digital data signals inputted into the first input node group and the second input node group and outputting the addition result, and said hold means for temporarily holding m-bit digital data signal of the addition result received from the adding means except the least significant bit and for outputting the held digital data signal from output node groups; and output node groups of the hold means of the respective computing means are connected to the output terminal groups corresponding to said first through $(2^k-1)$-th output node groups.

12. A data interpolating circuit comprising:

a first input terminal group and a second input terminal group for individually receiving two different m-bit digital data signals;

0-th through fifteenth output terminal groups for outputting the m-bit digital data signals respectively;

a 0-th hold means having an input node groups connected to said first input terminal group and an output node group connected to said 0-th output terminal group;

a sixteenth hold means having a input node groups connected to said second input terminal group;

an eighth computing means comprising an adding means having a first input node group connected to the output node group of said 0-th hold means and a second input node group connected to the output node group of said sixteenth hold means, and a hold means for temporarily holding an m-bit digital data signal of the addition result received from the adding means except the least significant bit and outputting the held digital data signal from an output node group to the eighth output terminal group;

a fourth computing means comprising an adding means having a first input node groups connected to the output node group of said 0-th hold means and a second input node group connected to the output node group of the hold means of said eighth computing means, and a hold means for temporarily holding an m-bit digital data signal of the addition result received from the adding means except the least significant bit and outputting the held digital data signal from an output node group to the fourth output terminal group;

a twelfth computing means comprising an adding means having a first input node group connected to the output node group of the hold means of said eighth computing means and a second input node group connected to the output node group of said sixteenth hold means, and a hold means for temporarily holding an m-bit digital data signal of the addition result received from the adding means except the least significant bit and outputting the held digital data signal from an output node group to the twelfth output terminal group;

a second computing means comprising an adding means having a first input node group connected to the output node group of said 0-th hold means and a second input node group connected to the output node group of the hold means of said fourth computing means, and a hold means for temporarily holding an m-bit digital data signal of the addition result received from the adding means except the least significant bit and outputting the held digital data signal from an output node group to the second output terminal group;

a sixth computing means comprising an adding means having a first input node group connected to the output node group of said 0-th hold means and a second input node group connected to the output node group of the hold means of said twelfth computing means, and a hold means for temporarily holding an m-bit digital data signal of the addition result received from the adding means except the least significant bit and outputting the held digital data signal from an output node group to the sixth output terminal group;

a tenth computing means comprising an adding means having a first input node group connected to the output node group of the hold means of said fourth computing means and a second input node group connected to the output node group of said sixteenth hold means, and a hold means for temporarily holding an m-bit digital data signal of the addition result received from the adding means except the least significant bit and outputting the held digital data signal from an output node group to the tenth output terminal group;

a fourteenth computing means comprising an adding means having a first input node group connected to the output node group of the hold means of said twelfth computing means and a second input node group connected to the output node group of said sixteenth hold means, and a hold means for temporarily holding an m-bit digital data signal of the addition result received from the adding means except the least significant bit and outputting the held digital data signal from an output node group to the fourteenth output terminal group;

a first computing means comprising an adding means having a first input node group connected to the output node group of said 0-th hold means and a second input node group connected to the output node group of the hold means of said second computing means, and a hold means for temporarily holding an m-bit digital data signal of the addition result received from the adding means except the least significant bit and outputting the held digital data signal from an output node group to the first output terminal group;

a third computing means comprising an adding means having a first input node group connected to the output node group of said 0-th hold means and a second input node group connected to the output node group of the hold means of said sixth computing means, and a hold means for temporarily holding an m-bit digital data signal of the addition result received from the adding means except the least significant bit and outputting the held digital data signal from an output node group to the third output terminal group;

a fifth computing means comprising an adding means having a first input node group connected to the output node group of said 0-th hold means and a second input node group connected to the output node group of the hold means of said tenth computing means, and a hold means for temporarily holding an m-bit digital data signal of the addition result received from the adding means except the least significant bit and outputting the held digital data signal from an output node group to the fifth output terminal group;

a seventh computing means comprising an adding means having a first input node group connected to the output node group of said 0-th hold means and a second input node group connected to the output node group of the hold means of said fourteenth computing means, and a hold means for temporarily holding an m-bit digital data signal of the addition result received from the adding means except the least significant bit and outputting the held digital data signal from an output node group to the seventh output terminal group;

a ninth computing means comprising an adding means having a first input node group connected to the output node group of the hold means of said second computing means and a second input node group connected to the output node group of said sixteenth hold means, and a hold means for temporarily holding an m-bit digital data signal of the addition result received from the adding means except the least significant bit and outputting the held digital data signal from an output node group to the ninth output terminal group;

an eleventh computing means comprising an adding means having a first input node group connected to the output node group of the hold means of said sixth computing means and a second input node group connected to the output node group of said sixteenth hold means, and a hold means for temporarily holding an m-bit digital data signal of the addition result received from the adding means except the least significant bit and outputting the held digital data signal from an output node group to the eleventh output terminal group;

a thirteenth computing means comprising an adding means having a first input node group connected to the output node group of the hold means of said tenth computing means and a second input node group connected to the output node group of said sixteenth hold means, and a hold means for temporarily holding an m-bit digital data signal of the addition result received from the adding means except the least significant bit and outputting the held digital data signal from an output node group to the thirteenth output terminal group; and a fifteenth computing means comprising an adding means having a first input node group connected to the output node group of the hold means of said fourteenth computing means and a second input node group connected to the output node group of said sixteenth hold means, and a hold means for temporarily holding an m-bit digital data signal of the addition result received from the adding means except the least significant bit and outputting the held digital data signal from an output node group to the fifteenth output terminal group.

* * * * *

UNITED STATES PATENT AND TRADEMARK OFFICE
CERTIFICATE OF CORRECTION

PATENT NO. : 5,815,419
DATED : September 29, 1998
INVENTOR(S) : Fujitomi, et. al.

It is certified that error appears in the above-identified patent and that said Letters Patent is hereby corrected as shown below:

Column 32, line 52, change "," to --is--;
         line 53, delete "humid value".

Signed and Sealed this

Ninth Day of February, 1999

Attest:

Attesting Officer

Acting Commissioner of Patents and Trademarks